United States Patent
Kralles et al.

(10) Patent No.: US 7,368,747 B2
(45) Date of Patent: May 6, 2008

(54) SHORT U-FLOW MULTICASSETTE AUTOLOADER FOR A STORAGE PHOSPHOR READER

(75) Inventors: Christopher J. Kralles, Rochester, NY (US); William C. Wendlandt, Rush, NY (US)

(73) Assignee: Carestream Health, Inc., Rochester, NY (US)

( * ) Notice: Subject to any disclaimer, the term of this patent is extended or adjusted under 35 U.S.C. 154(b) by 164 days.

(21) Appl. No.: 11/015,906

(22) Filed: Dec. 17, 2004

(65) Prior Publication Data

US 2006/0131525 A1  Jun. 22, 2006

(51) Int. Cl.
*B65H 5/00* (2006.01)
*G03B 42/00* (2006.01)

(52) U.S. Cl. ............... 250/589; 250/584; 250/585; 250/586; 250/590

(58) Field of Classification Search ......... 250/580–591
See application file for complete search history.

(56) References Cited

U.S. PATENT DOCUMENTS

| | | | |
|---|---|---|---|
| 4,893,011 A | 1/1990 | Bauer et al. | |
| 4,908,514 A | 3/1990 | Bauer et al. | |
| 5,315,632 A * | 5/1994 | Flynn et al. | 378/167 |
| 5,324,957 A * | 6/1994 | Hejazi | 250/589 |
| 5,326,983 A * | 7/1994 | Hejazi | 250/589 |
| 5,328,019 A * | 7/1994 | Boutet et al. | 198/624 |
| 5,340,995 A | 8/1994 | Verbeke et al. | |
| 5,493,128 A * | 2/1996 | Boutet | 250/584 |
| 5,530,259 A * | 6/1996 | Arakawa | 250/584 |
| 6,365,909 B1 * | 4/2002 | Hayakawa et al. | 250/584 |
| 6,437,359 B1 | 8/2002 | Hall et al. | |
| 2001/0006223 A1 | 7/2001 | Hoitz | |
| 2002/0060303 A1* | 5/2002 | Yonekawa | 250/589 |
| 2004/0169152 A1* | 9/2004 | Tsutoh et al. | 250/589 |
| 2004/0183039 A1* | 9/2004 | Iiyama | 250/589 |
| 2006/0060805 A1* | 3/2006 | Ohtsuka et al. | 250/589 |

FOREIGN PATENT DOCUMENTS

| EP | 0 919 857 | 6/1999 |
|---|---|---|
| EP | 1 102 118 | 5/2001 |
| JP | 2004-264586 | 9/2004 |

* cited by examiner

*Primary Examiner*—David Porta
*Assistant Examiner*—Casey Bryant

(57) ABSTRACT

A storage phosphor reader includes a multicassette autoloader for vertically oriented storage phosphor cassettes, the autoloader having a front, back, and opposite sides. The autoloader includes an input bin for receiving multiple vertically oriented storage phosphor cassettes stacked together in face-to-face contact such that said cassette faces face front and back; wherein each of said cassettes contains a storage phosphor which is removable from said cassette; and an output bin located beside said input bin, said output bin having a storage phosphor read location at which a storage phosphor is removed from and replaced in a storage phosphor cassette positioned at said storage phosphor read location, and having an output region for read cassettes to be subsequently removed from said output bin.

12 Claims, 25 Drawing Sheets

SHORT U-FLOW MULTICASSETTE AUTOLOADER FOR A STORAGE PHOSPHOR READER

FIELD OF THE INVENTION

The invention relates generally to the field of computed radiography, and in particular to a multicassette autoloader for a storage phosphor reader. More specifically, the invention relates to a multicassette autoloader which receives a stack of vertically oriented storage phosphor cassettes in an input bin, moves the cassettes serially in a short U path from the input bin to a storage phosphor read location in an output bin and then to an output region of the output bin.

BACKGROUND OF THE INVENTION

Conventional film/screen radiography uses radiographic films which are not reusable. Computed radiography solves this problem by using reusable storage phosphors that can be exposed, read out, erased and reused many times. In order to protect the storage phosphor from damage during use, it is contained in a cassette from which it is removed during the reading and erasing process. One type of storage phosphor reader receives cassettes, one at a time, oriented horizontally. The cassette containing an exposed storage phosphor is presented to the reader horizontally, the storage phosphor is removed from the cassette and moved along a horizontal path, where it is read and then erased before the storage phosphor is replaced in its cassette. The cassette is then removed and a new cassette manually presented to the reader. In order to increase storage phosphor reader throughput and to relieve the reader user of sequentially loading and unloading storage phosphor cassettes, a multi-cassette autoloader was developed (See: U.S. Pat. No. 5,324,957, issued Jun. 28, 1994, inventor Hejazi). The autoloader disclosed in the latter patent is a separate piece of equipment from the storage phosphor reader and utilizes cog belts to index a plurality of horizontally oriented cassettes to a read site where the storage phosphors are removed from the cassettes and transported into and out of the storage phosphor reader. Because the cog belts are designed to accept only one size of cassette, the largest, and because many sized cassettes are used in the medical imaging field, pallets are used to handle smaller sized cassettes.

Although the latter autoloader is useful and successful for its intended purposes, it has certain drawbacks. Because the autoloader is a separate piece of equipment, substantial floor space is required to accommodate both the reader and the autoloader. Moreover, the use of pallets requires additional manual operations for the operator and creates storage problems when the pallets are not being utilized. A more compact storage phosphor reader is disclosed in U.S. Pat. No. 6,437,359 B1, issued Aug. 20, 2002, inventors Hall et al. As disclosed in the latter patent, the storage phosphor reader receives a storage phosphor cassette in a vertical orientation, removes the storage phosphor from the cassette, transports the storage phosphor along a vertical path where it is read and erased and replaces the storage phosphor in the cassette. An autoloader for such a vertically oriented storage phosphor reader is disclosed in U.S. Pat. No. 5,493,128, issued Feb. 20, 1996, inventor Boutet. The disclosed autoloader is combined with the storage phosphor reader resulting in the need for less floor space for the combined equipment. Moreover, the vertical autoloader automatically handles storage phosphor cassettes of varying sizes without the use of pallets. The vertical autoloader includes a cassette loading station and a cassette unloading station separated by a read site where an exposed storage phosphor is removed from and replaced in the storage phosphor cassette for vertical processing by the storage phosphor reader. Each of the cassette loading and cassette unloading stations includes a plurality of cassette locating slots defined by movable rear and bottom separators and indexers. The operator must load each cassette individually into a loading slot before the next cassette can be loaded. Moreover, the cassette must be loaded with the face oriented 90 degrees from the direction of loading in order to position it correctly into a cassette location slot.

Another generally vertically oriented storage phosphor reader is disclosed in U.S. Pat. No. 4,893,011, issued Jan. 9, 1990, inventors Bauer et al. The disclosed apparatus occupies a large floor area and is not provided with an autoloader to handle multiple cassettes of varying sizes. Moreover, the storage phosphor is removed from the cassette at one location and replaced in the cassette at another location resulting in inefficiencies.

While such systems may have achieved certain degrees of success in their particular applications, there is a need to provide an autoloader for vertically oriented storage phosphor cassettes of varying sizes which is easy to use, which allows the operator to load multiple cassettes at a time without regard to size and which is easily accessible.

SUMMARY OF THE INVENTION

According to the present invention, there is provided a solution to the problems and a fulfillment of the needs discussed above.

According to one aspect of the invention, there is provided a multicassette autoloader for vertically oriented storage phosphor cassettes, the autoloader having a front, back, and opposite sides, comprising:

an input bin for receiving multiple vertically oriented storage phosphor cassettes stacked together in face-to-face contact such that said cassette faces face front and back; wherein each of said cassettes contains a storage phosphor which is removable from said cassette; and an output bin located beside said input bin, said output bin having a storage phosphor read location at which a storage phosphor is removed from and replaced in a storage phosphor cassette positioned at said storage phosphor read location, and having an output region for read cassettes to be subsequently removed from said output bin.

The invention has the following advantages.

1. An autoloader is provided for a storage phosphor reader which handles vertically oriented storage phosphor cassettes of varying sizes and which is located at the top of the reader, thus occupying the same footprint as the reader.

2. The autoloader is easy to use and easily accessible by an operator to load multiple cassettes at a time without regard to size and without the necessity of positioning individual cassettes in the autoloader.

BRIEF DESCRIPTION OF THE DRAWINGS

The foregoing and other features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
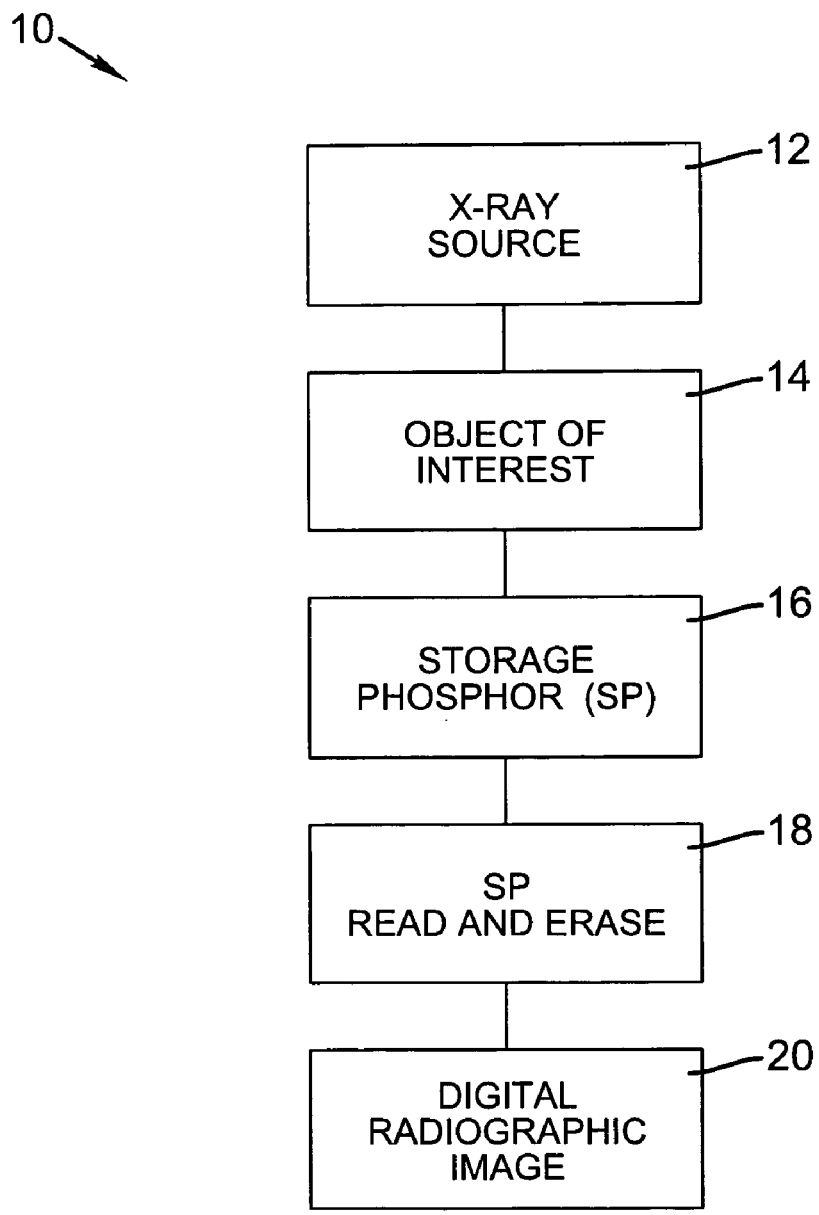
FIG. 1 is a block diagram showing a computed radiography system including an embodiment of the present invention.

The following is a detailed description of the preferred embodiments of the invention, reference being made to the drawings in which the same reference numerals identify the same elements of structure in each of the several figures.

The multicassette vertical autoloader of the present invention is used with a storage phosphor reader which is part of a computed radiography system. In general, computed radiography utilizes the principle that exposure of a storage phosphor to a radiographic image produces a corresponding latent image in the storage phosphor. If the storage phosphor is raster scanned (e.g., by means of a laser) in a storage phosphor reader with light of a first wavelength, the latent image will be emitted as a light image at a second wavelength. The emitted light image is converted into a digital image which can be processed, stored, displayed, and used to produce a hardcopy (film, paper) radiographic image.

FIG. 1 shows a generic computed radiography system 10 including the present invention. X-ray source 12 irradiates object of interest 14 (such as a body part) to produce a radiographic image which exposes storage phosphor (SP) 16. The latent radiographic image stored in storage phosphor 16 is read out in storage phosphor read and erase 18 as a digital radiographic image 20. The storage phosphor 16 is erased in SP read and erase 18 so that it can be reused. The digital radiographic image 20 can be processed to enhance the image, stored for later use, displayed on a display monitor for diagnostic purposes, transmitted to a remote location and/or used to produce a hard copy print (film or paper).

Figure 2:
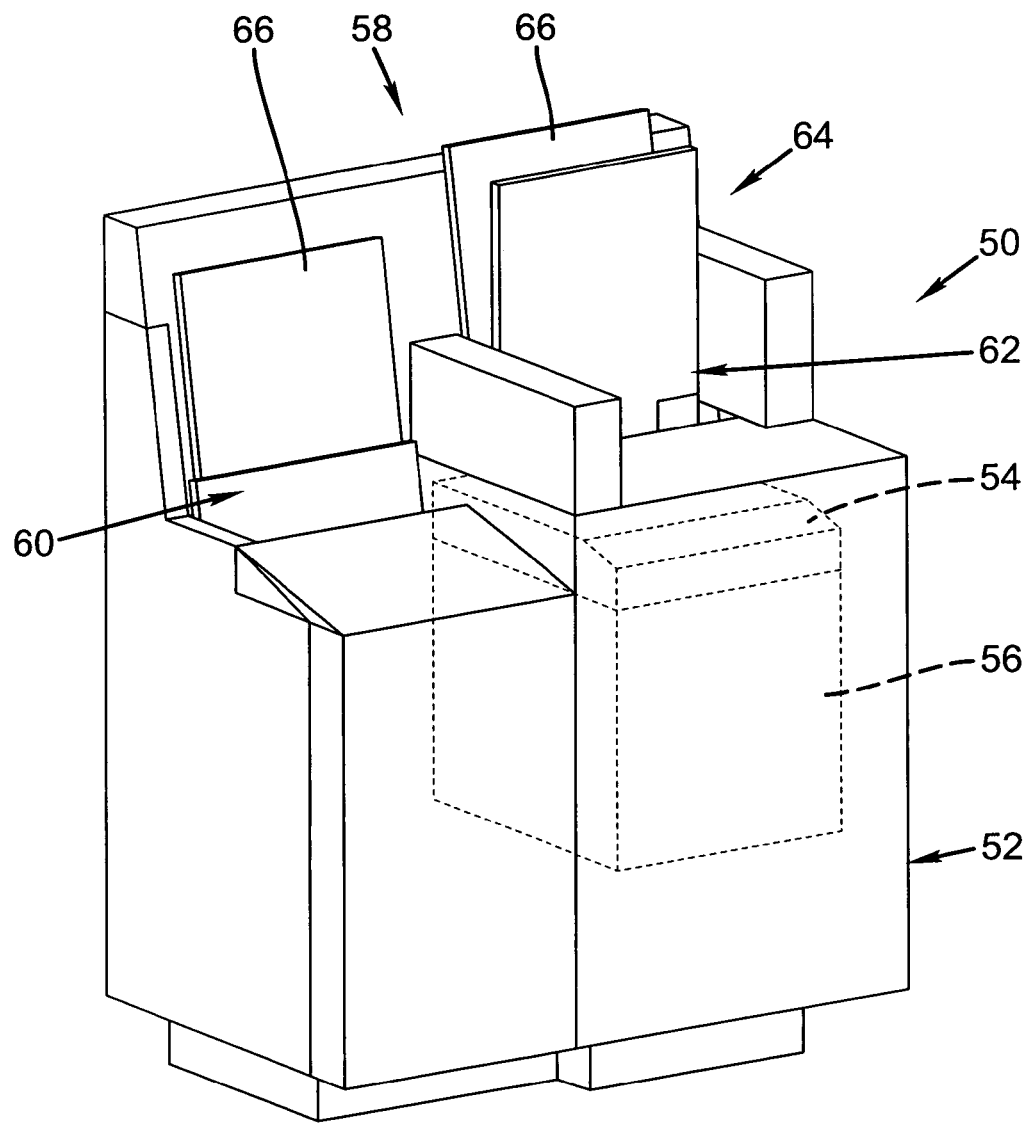
FIGS. 2 and 3 are respective left and right front perspective views showing a storage phosphor reader including the present invention.
Figure 3:
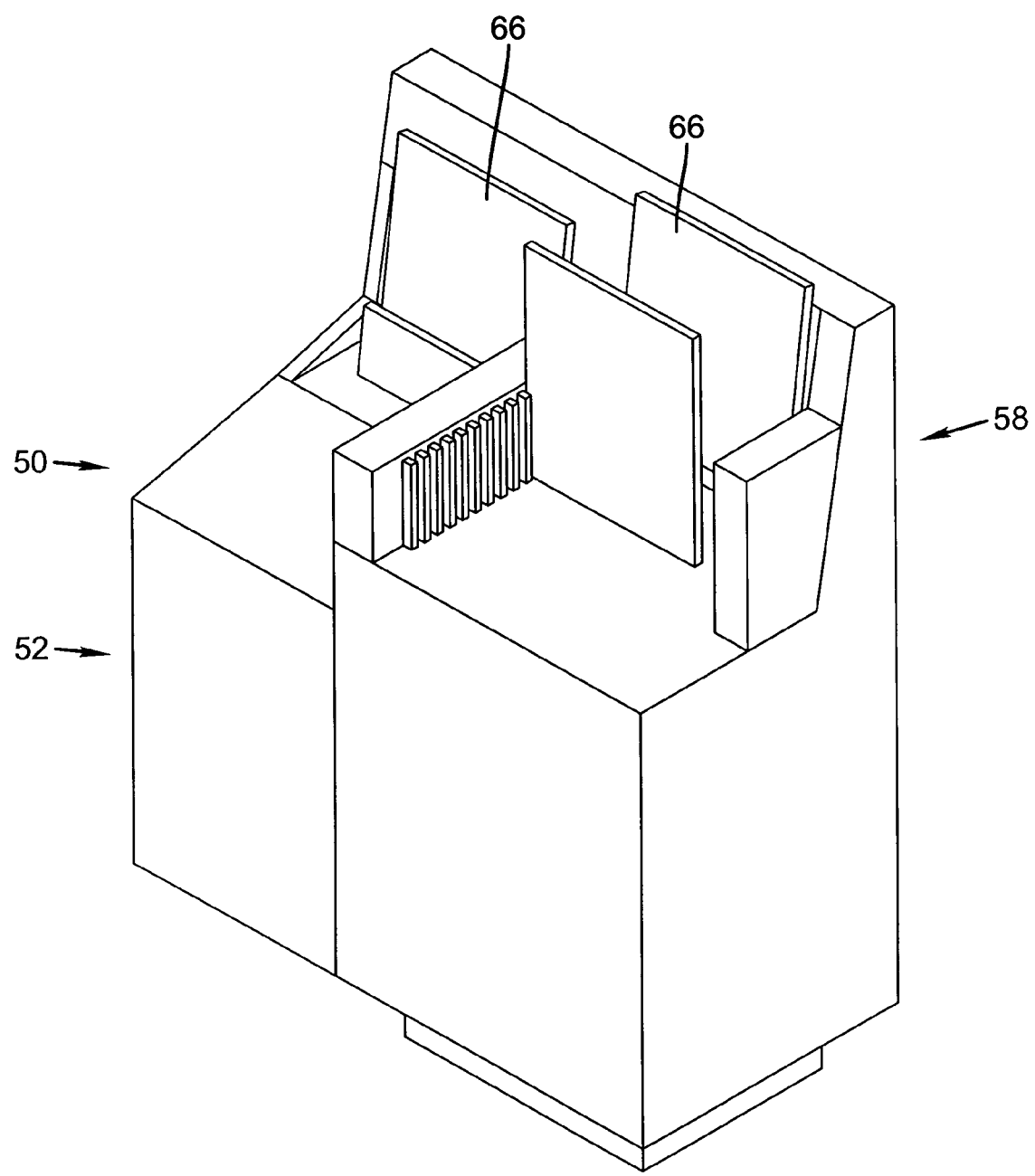
Figure 6:
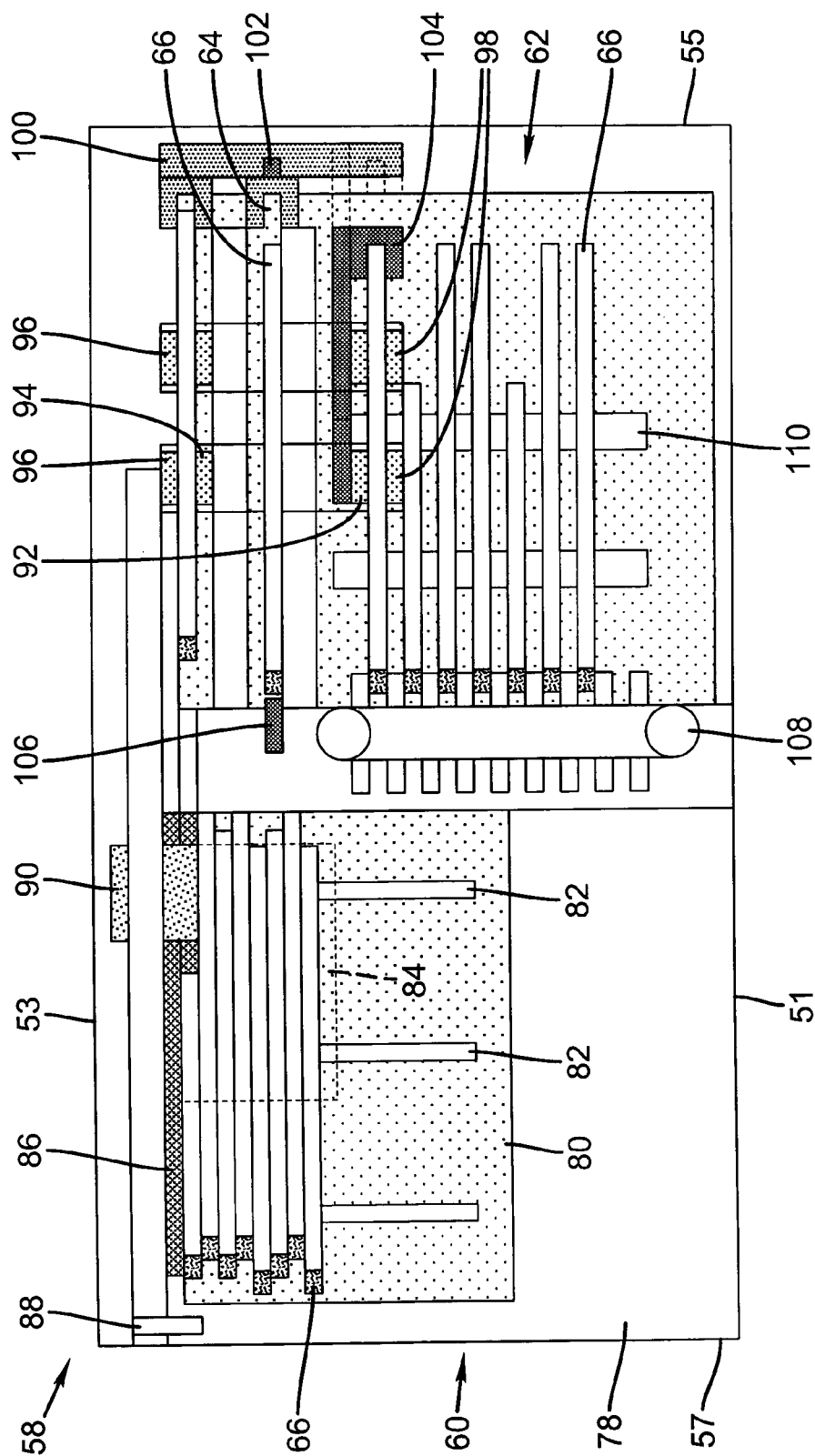
FIG. 6 is a top plan, diagrammatic view of the embodiment of the present invention shown in FIGS. 2 and 3.

FIGS. 2 and 3 are respective left front and right front perspective views of a storage phosphor reader including an embodiment of the multicassette vertical autoloader of the present invention. As shown, storage phosphor reader 50 includes a housing 52 for supporting the components of reader 50, such as read module 54 and erase module 56 (both shown in dashed lines in FIG. 2). Multicassette, vertical autoloader 58 is mounted on the top of and forms an integral part of reader 50 and thus occupies the same footprint as reader 50. Autoloader 58 includes an input bin 60, an output bin 62 located beside input bin 60, and a storage phosphor read location 64 located in output bin 62 (shown in greater detail later). Autoloader 58 also includes a front 51, back 53, and opposite sides 55 and 57 (FIG. 6).

One or more storage phosphor cassettes 66 (each of which contains a storage phosphor which is removable from cassette 66) are loaded as a stack into input bin 60 in face-to-face contact and such that the cassette faces face front and back. The foremost cassette 66 in the stack of cassettes 66 is transported from input bin 60 to the storage phosphor read location 64 of output bin 62. At read location 64, the storage phosphor contained in cassette 66 is removed from cassette 66 and transported vertically past read module 54 and erase module 56. The read and erased storage phosphor is then replaced in cassette 66 which is transported out of read location 64 to an output region of output bin 62.

Figure 4:
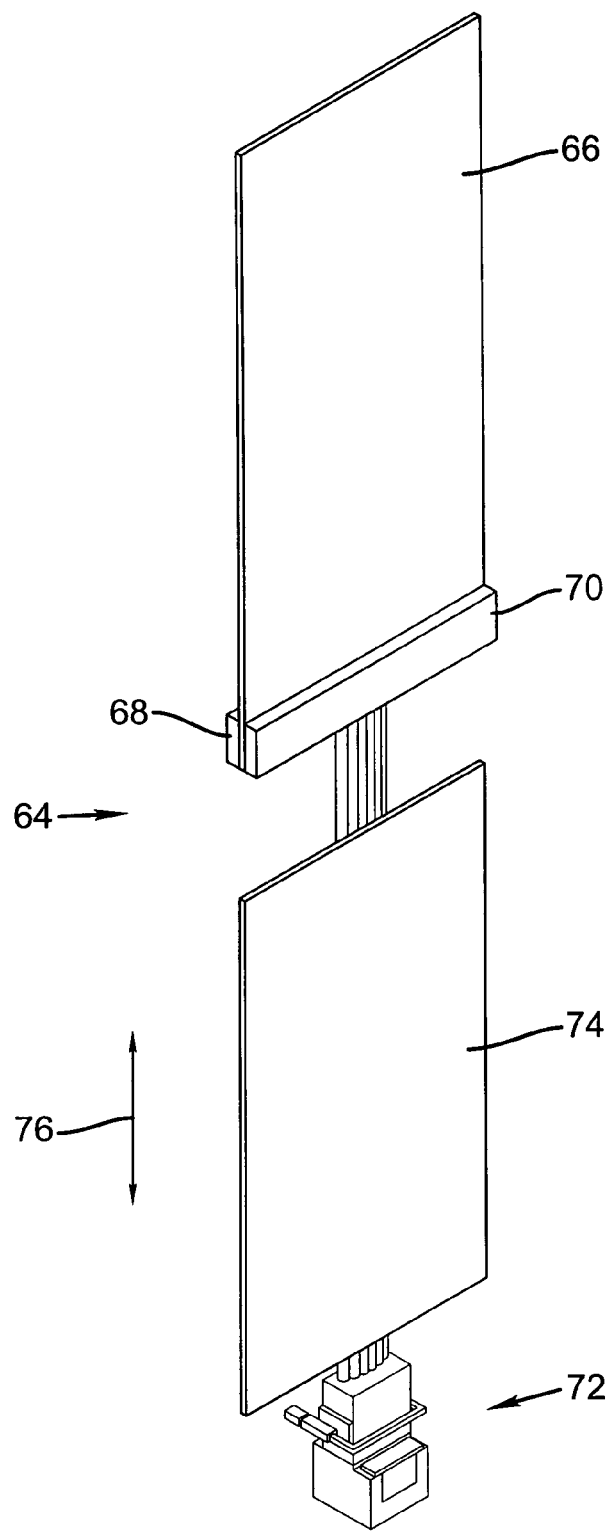
FIGS. 4 and 5 are respective front perspective and side elevational, diagrammatic views showing a vertical scanning assembly which can be incorporated in the storage phosphor reader shown in FIGS. 2 and 3.
Figure 5:
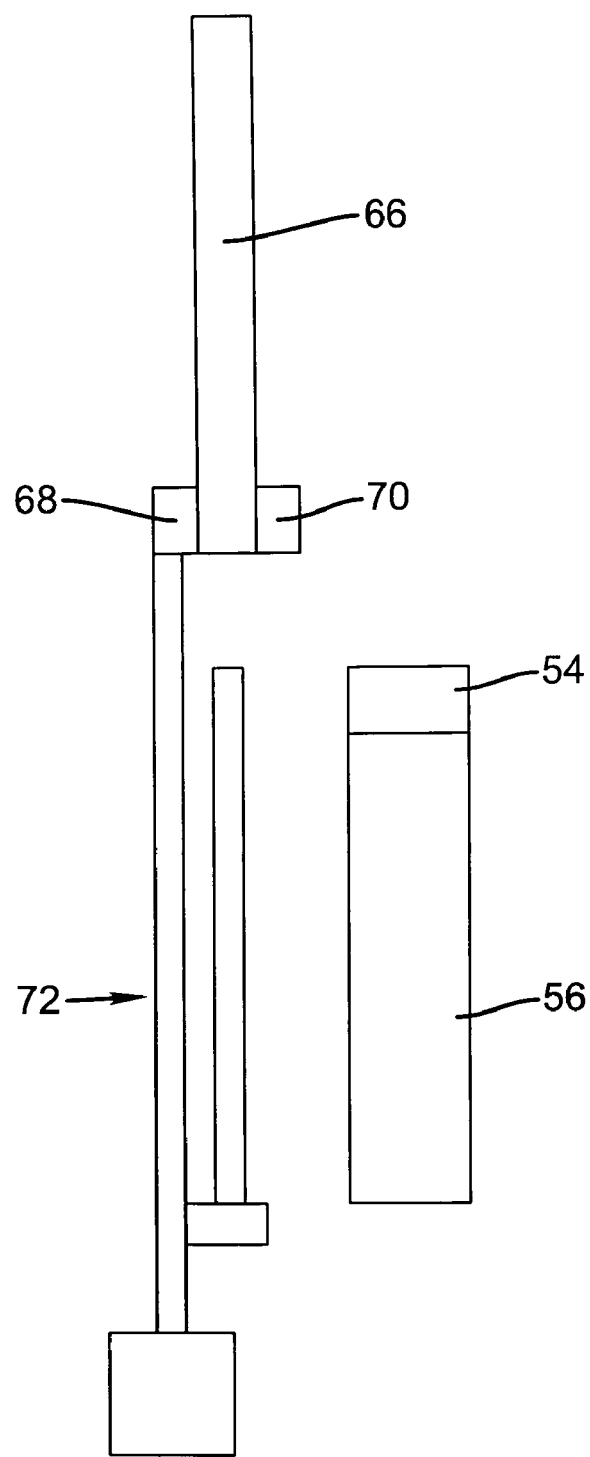

Referring now to FIGS. 4 and 5 there is shown an exemplary vertical assembly for transporting a storage phosphor from cassette 66, past read and erase modules 54, 56 and then back to cassette 66 (The assembly described in greater detail in U.S. Pat. No. 6,437,359 B1, issued Aug. 20, 2002, inventors Hall et al. can be used or any other suitable assembly). As shown, storage phosphor cassette 66 is held at storage phosphor read location 64 of storage phosphor reader 50 by clamps 68 and 70. A storage phosphor transport assembly 72 removes storage phosphor 74 from cassette 66 and transports storage phosphor 74 vertically past read module 54 and erase module 56. Transport assembly 72 then transports storage phosphor 74 vertically to replace it in cassette 66. The vertical transport directions of storage phosphor 74 are represented by bidirectional arrow 76.

Referring now to FIGS. 6-25 there will be described in greater detail, the structure and operation of a embodiment of the present invention shown in FIGS. 2 and 3. Referring to FIG. 6, autoloader 58 includes side-by-side input bin 60 and output bin 62. Storage phosphor read location 64 is located in output bin 62. Input bin 60 has a first inclined bottom wall 78 and a second reverse inclined bottom wall 80

(FIG. 8) having guides 82 (FIG. 6) to assist in gravity feeding of cassettes 66. Cassette stack pullback 84 and cassette lifter mechanism 86 are also located in input bin 60. Cassette stripper 88 transports a cassette 66 from input bin 60 to output bin 62 past bar code scanner 90. Output bin 62 includes fixed clamp 92, movable clamp 94, loaders 96, unloaders 98, side shuttle 100, ejector 102, stripper 104, size changer/light curtain 106, side cog belt 108, and bottom belts 110. Cassettes 66 are shown in FIG. 6 in input bin 60 and output bin 62. A cassette 66 is also shown at read location 64.

Figure 7:
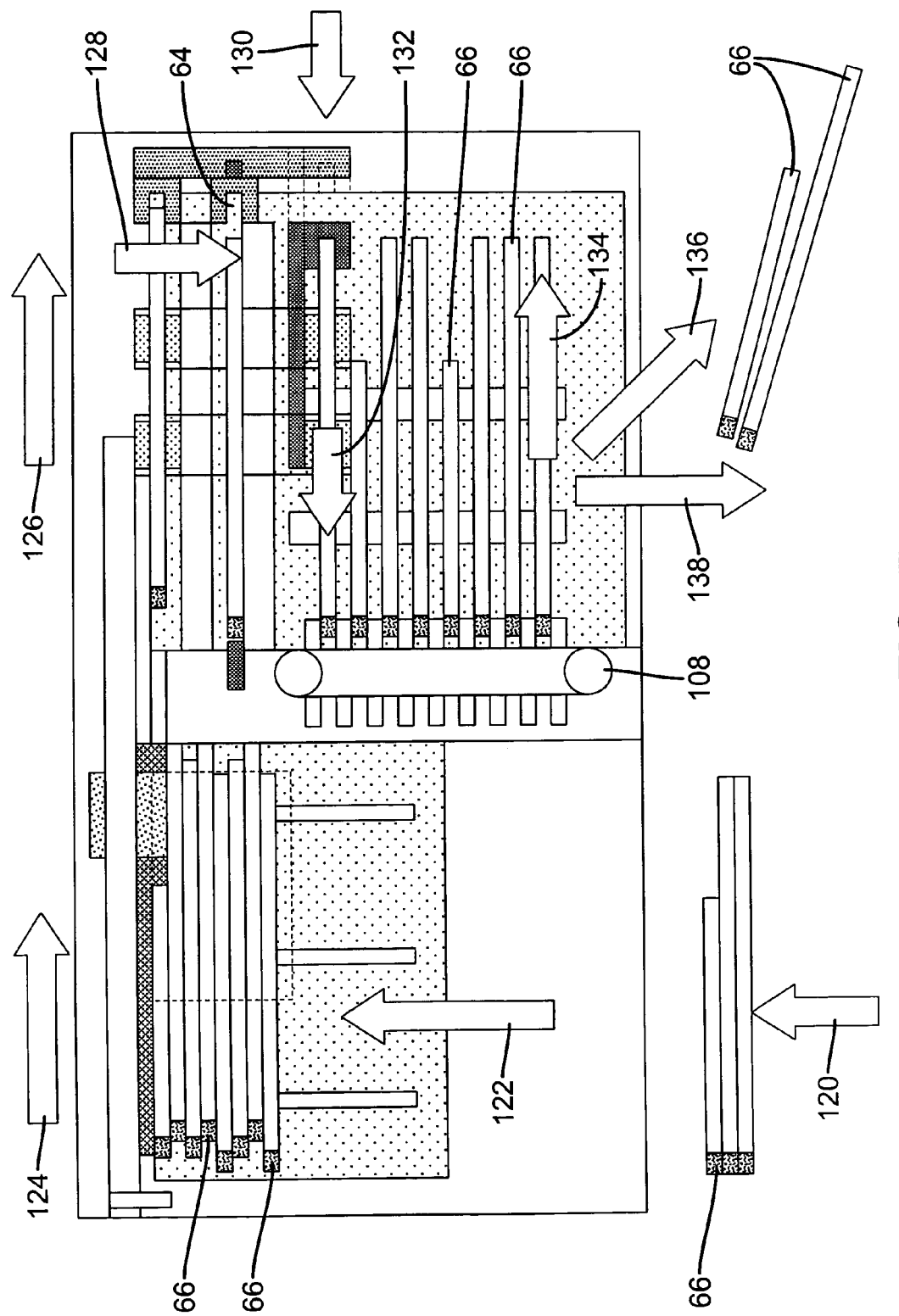
FIG. 7 is a top plan, diagrammatic view of the embodiment of FIG. 6 showing the storage phosphor cassette flow path.
Figure 8:
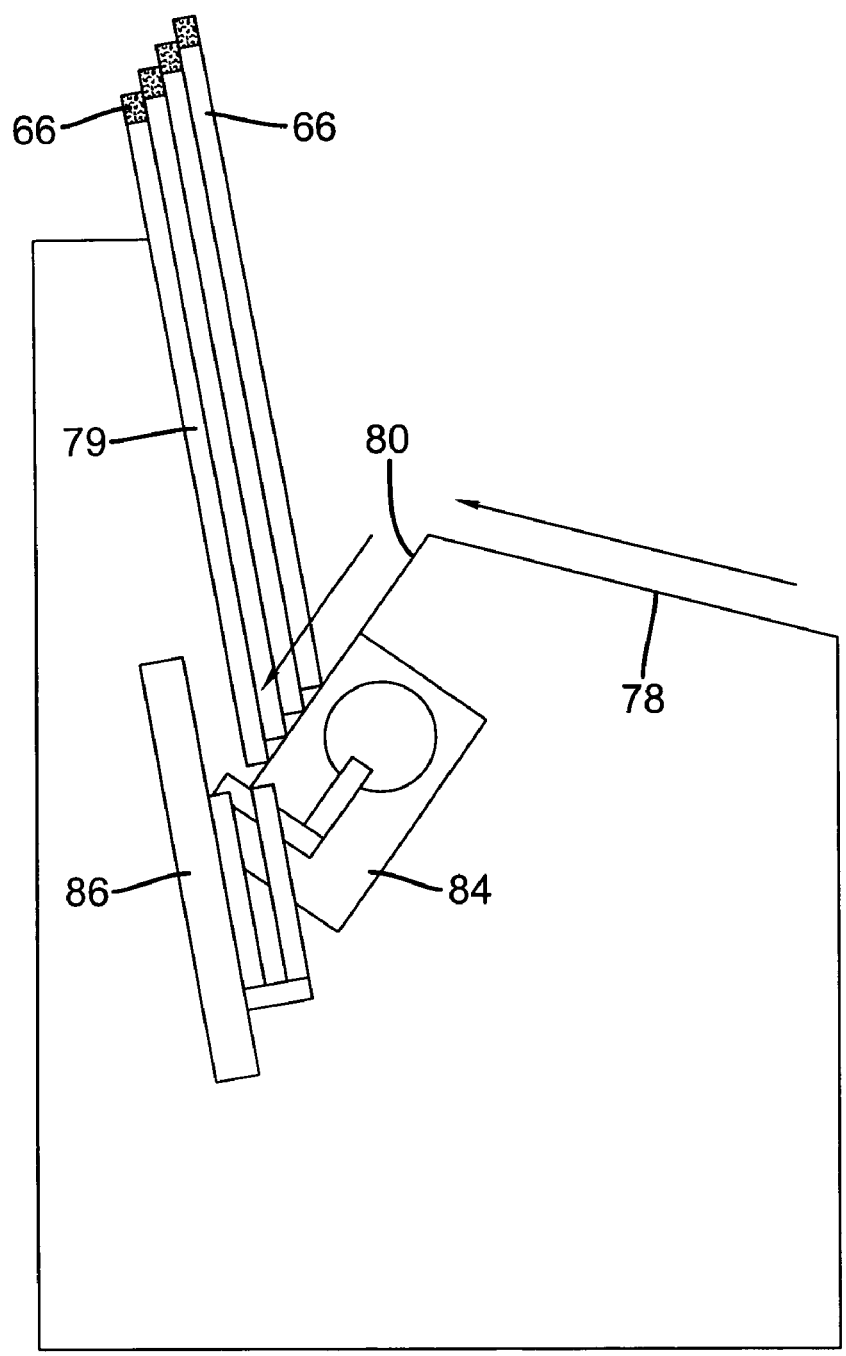
FIGS. 8, 9, 10, and 11 are respective side elevational, diagrammatic views of the embodiment of FIG. 6 showing a sequence of cassette handling operations in the input bin.

FIG. 7 is a diagrammatic view showing the short-U transport path of cassettes in autoloader 50. As shown, storage phosphor cassettes 66 of different sizes are stacked face-to-face in input bin 60 such that the cassette faces face front and back (arrows 120 and 122). The leading unread cassette 66 in input bin 60 is transported from input bin 60 to output bin 62 (arrows 124 and 126). The unread cassette 66 is then transported to storage phosphor read location 64 (arrow 128). After the storage phosphor has been replaced in a cassette 66 at read location 64, the cassette 66 is transported out of read location 64 and into cog belt 108 (arrows 130 and 132) which transports the cassette to the front of output bin 62 for removal from autoloader 50 from the front, diagonally, and/or from the side (arrows 134, 136, 138).

Figure 9:
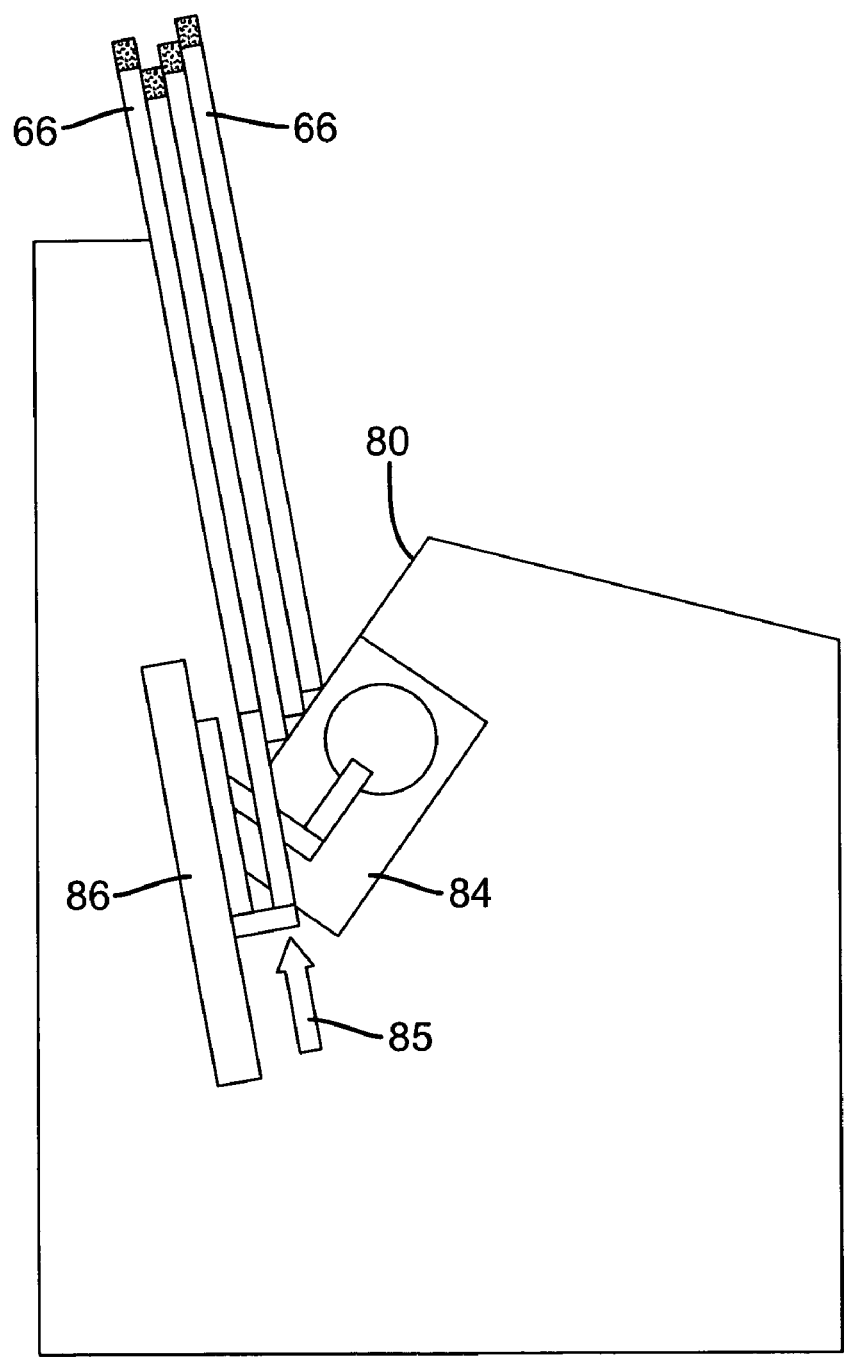
Figure 10:
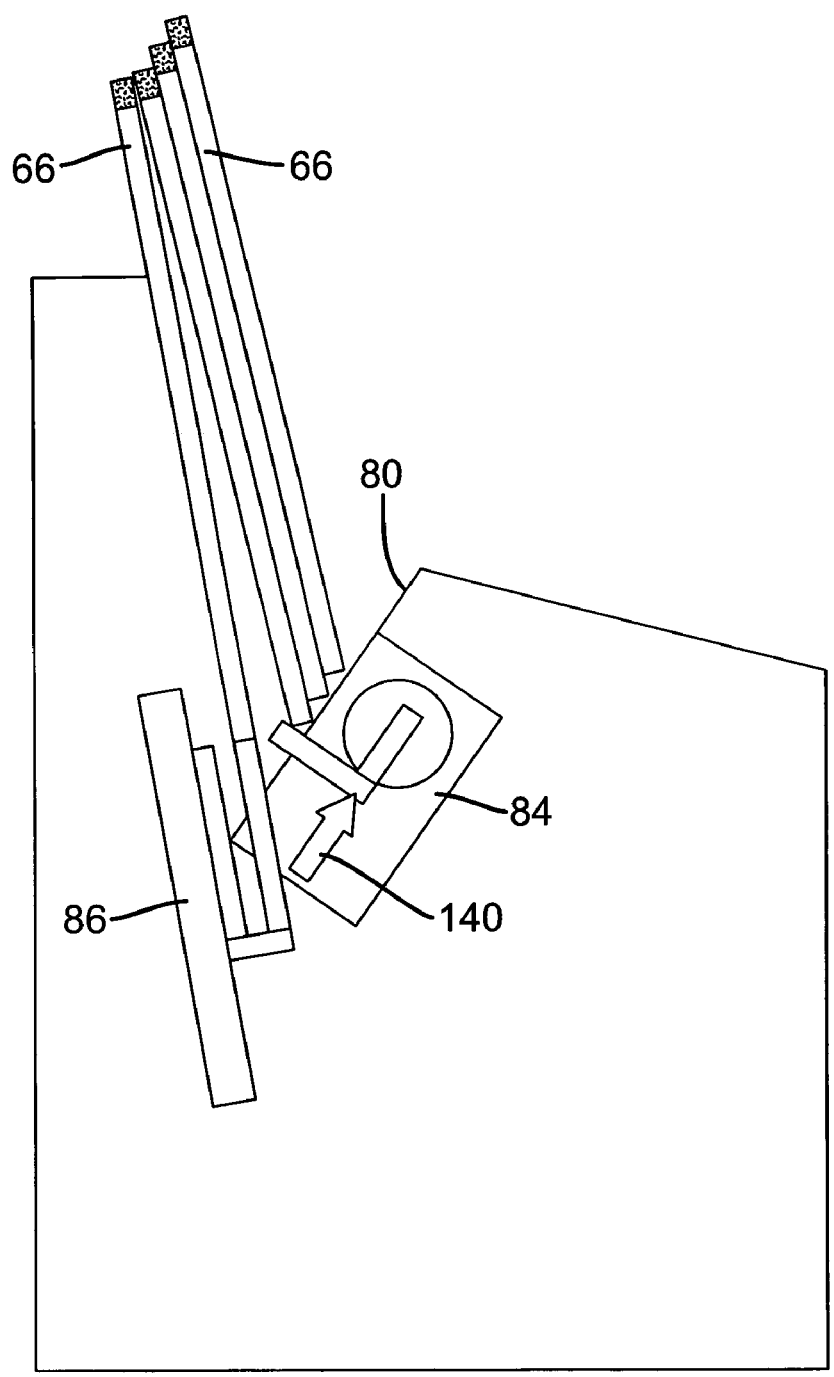
Figure 11:
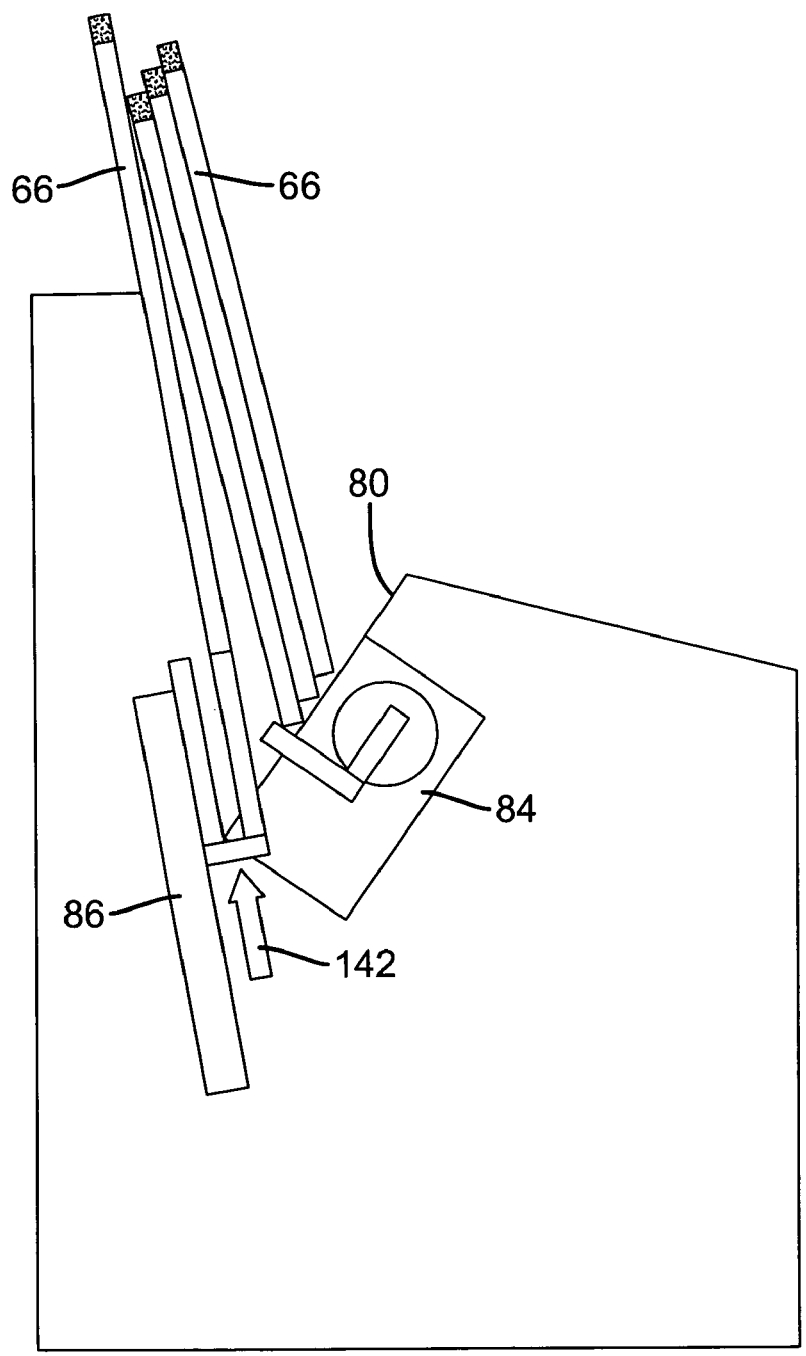
Figure 12:
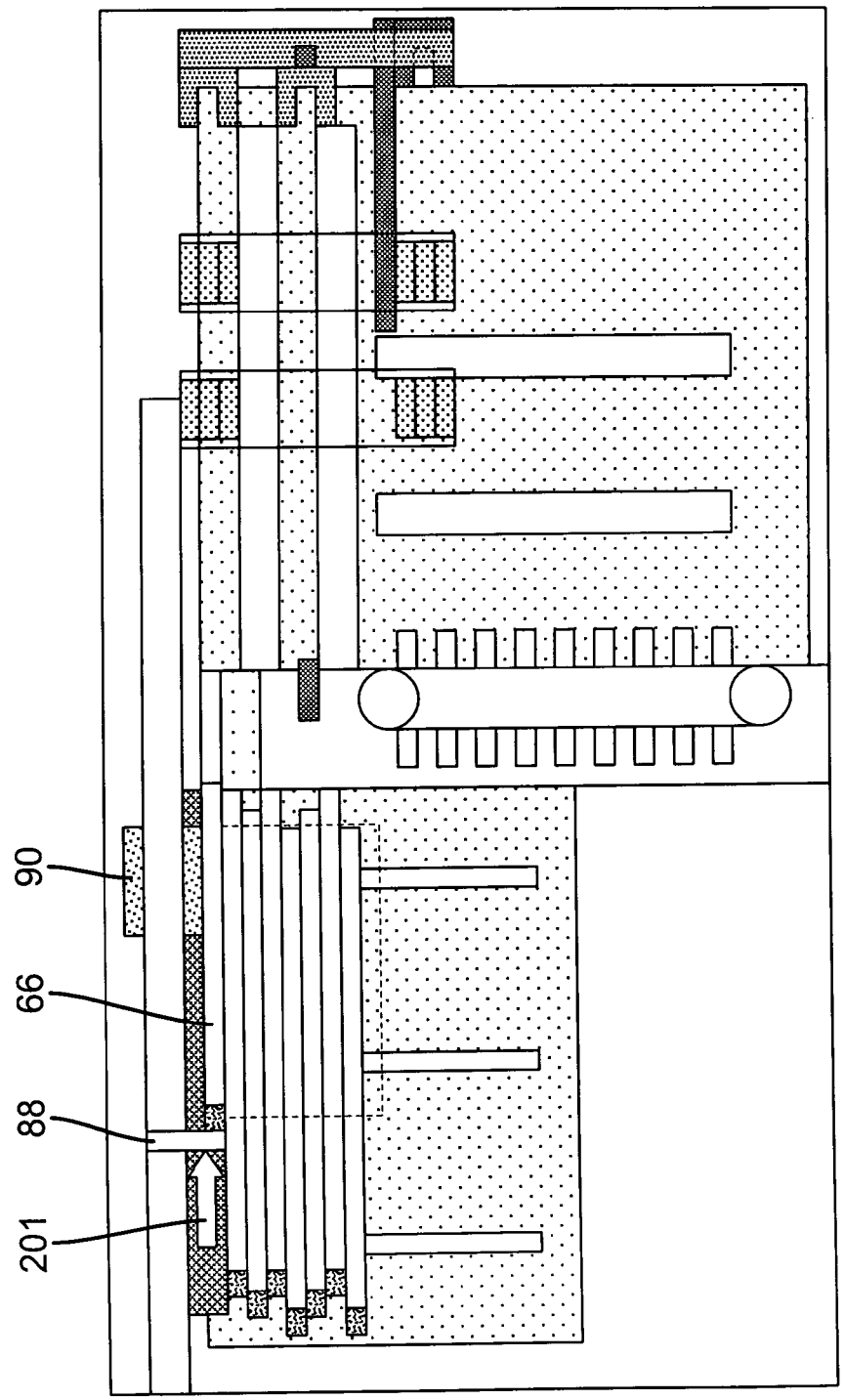
FIG. 12 is a top, plan diagrammatic view of the embodiment of FIG. 6 showing the stripping of a storage phosphor cassette from the input bin past the bar code scanner.
Figure 13:
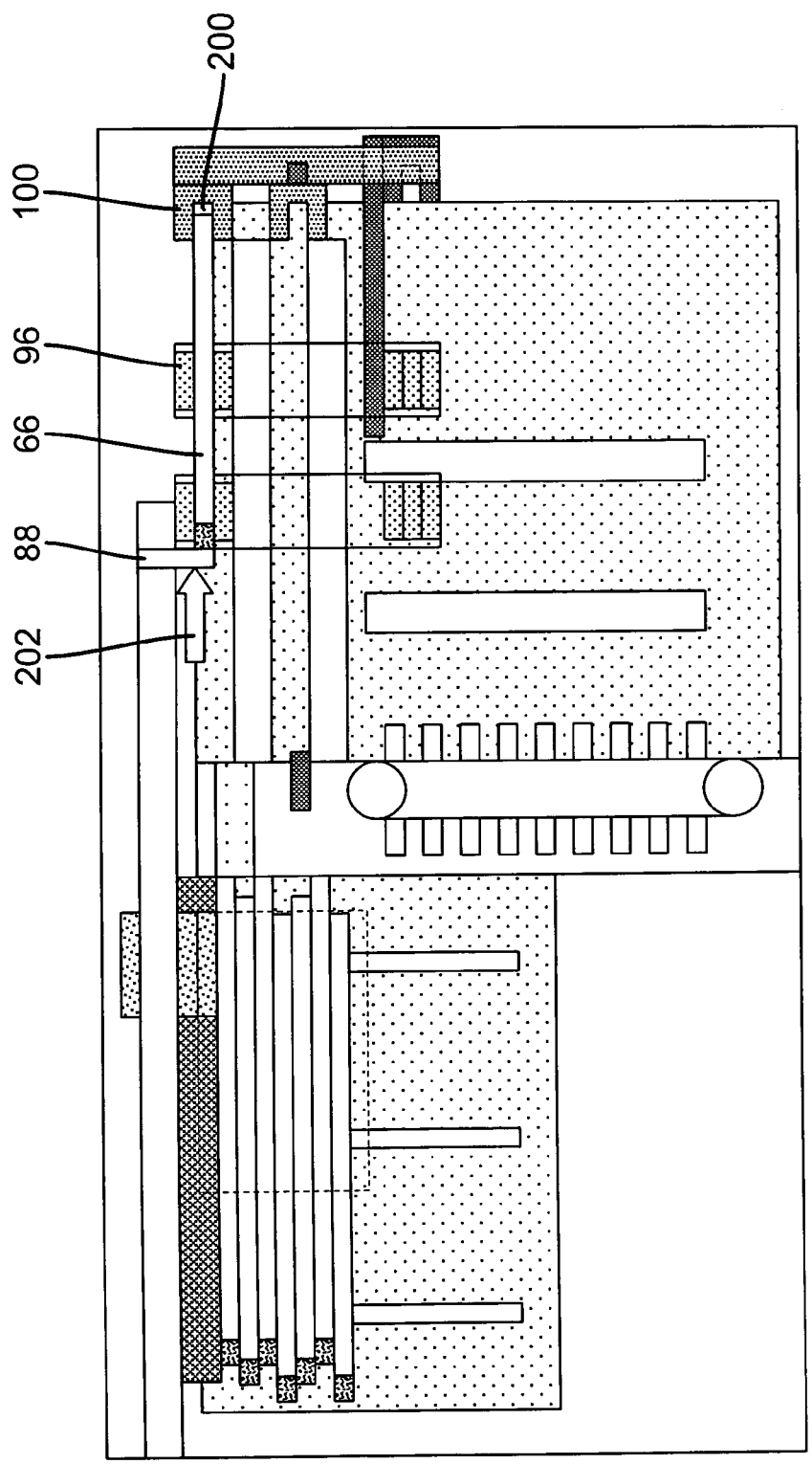
FIG. 13 is a top, plan diagrammatic view of the embodiment of FIG. 6 showing the stripping of a storage phosphor cassette to the side shuttle at the pre-read location of the output bin.

Referring now to FIGS. 8-11, there will be described the operation of cassette stack pullback 84 and cassette lifter mechanism 86. Cassettes 66 are first guided along first inclined bottom wall 78 before being deposited on second inclined bottom wall 80 in a face-to-face stack against front wall 79 through the assistance of gravity (See FIG. 8). Cassette lifter mechanism 86 lifts the leading cassette 66 (arrow 85) to expose the bottom edge of the next cassette 66 (FIG. 9). Stack pullback 84 pulls the stack of cassettes 66 in the direction of arrow 140 away from the foremost cassette 66 up bottom wall 80 in order to reduce the load on the foremost cassette 66 and to separate the cassettes (FIG. 10). Cassette lifter mechanism 86 raises the foremost cassette 66 in the direction of arrow 142 for stripping while cassette stack pullback 84 continues to hold the other cassettes 66 in the stack away from the foremost cassette 66 (FIG. 11).

Figure 14:
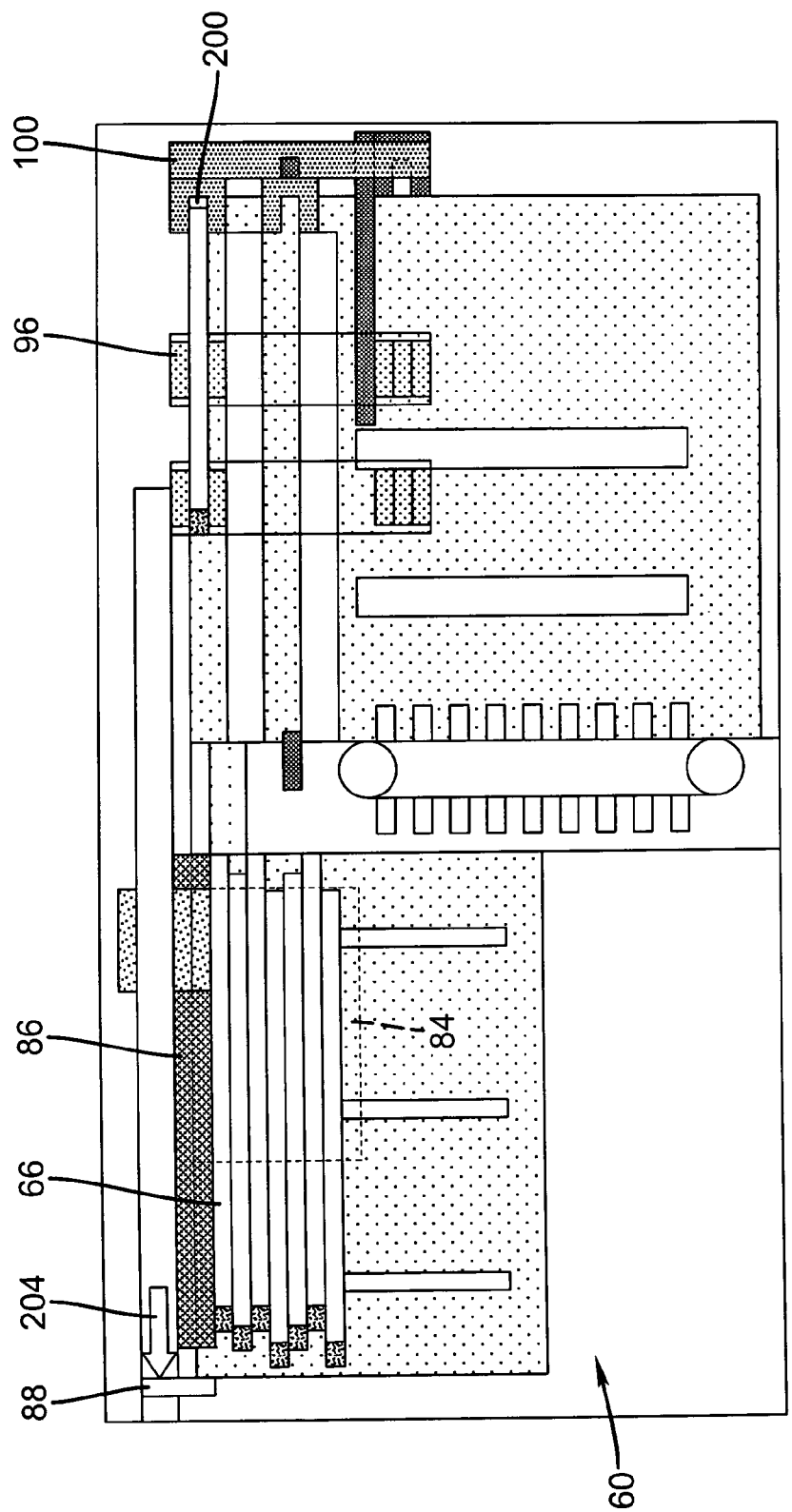
FIG. 14 is a top, plan diagrammatic view of the embodiment of FIG. 6 showing the homing of the stripper, cassette stack pullback, and cassette lifter mechanism.
Figure 15:
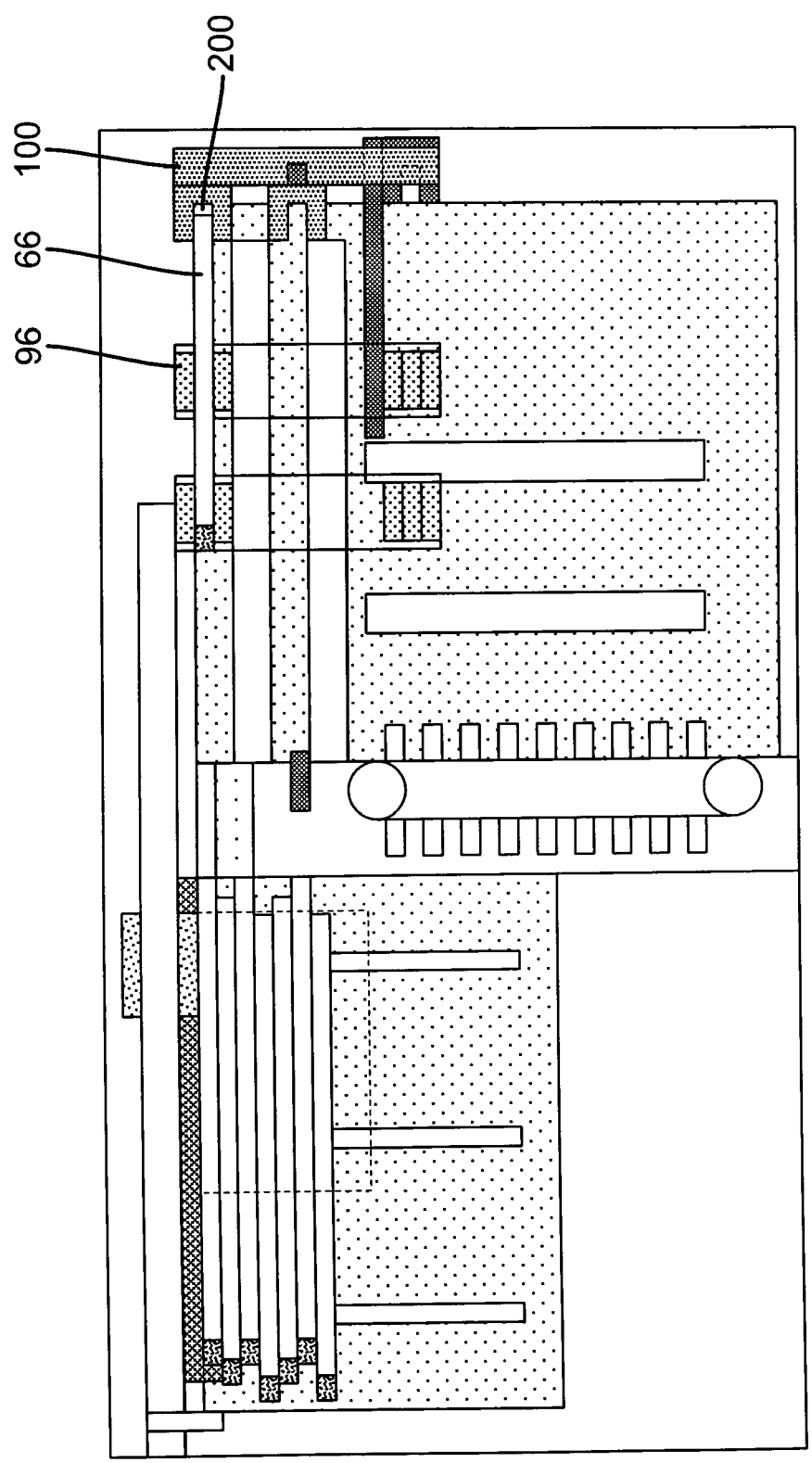
FIGS. 15, 16 and 17 are respective top, plan diagrammatic views of the embodiment of FIG. 6 showing translation of the storage phosphor cassette from the pre-read location of the output bin to the read location where a storage phosphor is removed from and replaced in the storage phosphor cassette.
Figure 16:
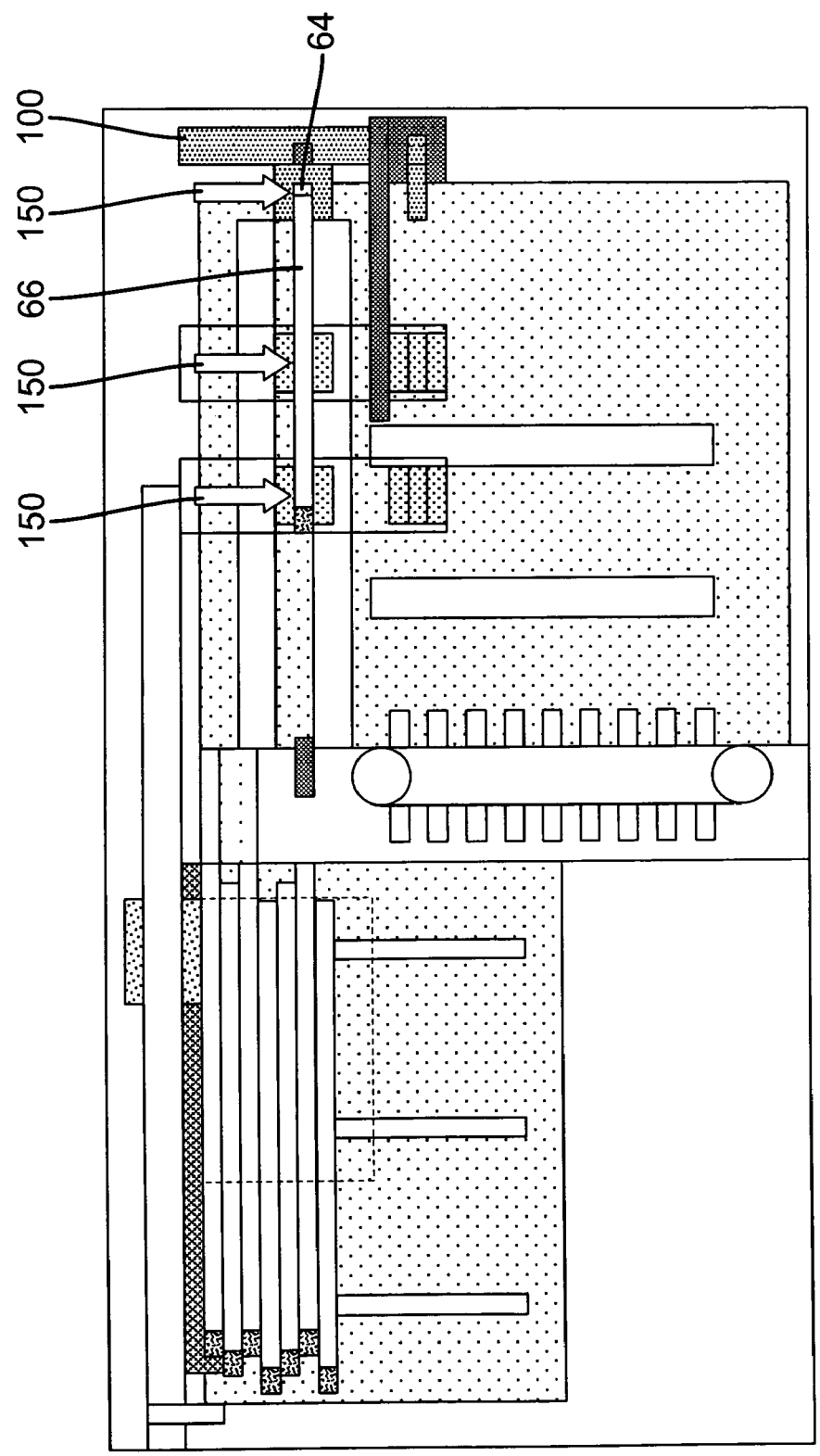
Figure 17:
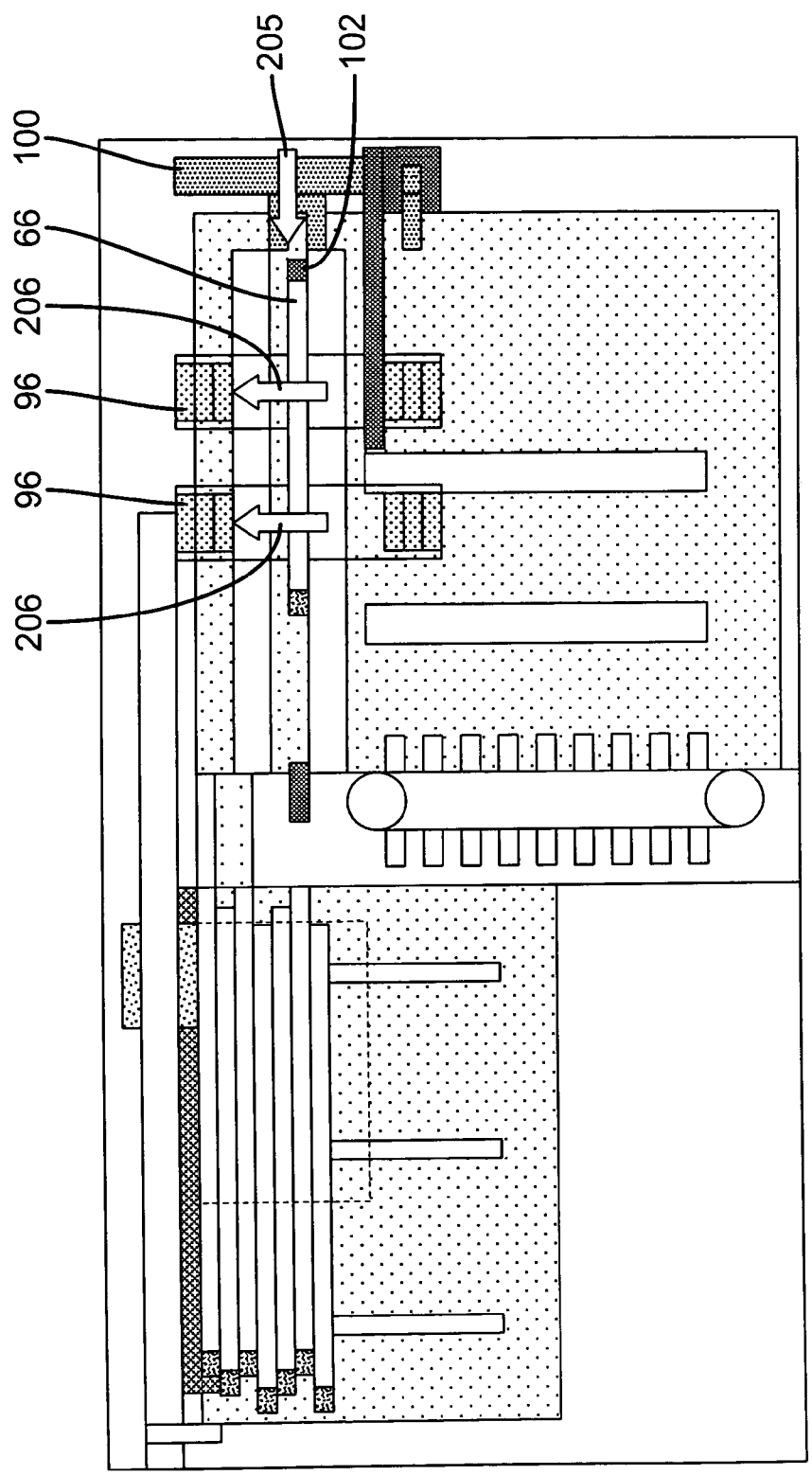
Figure 18:
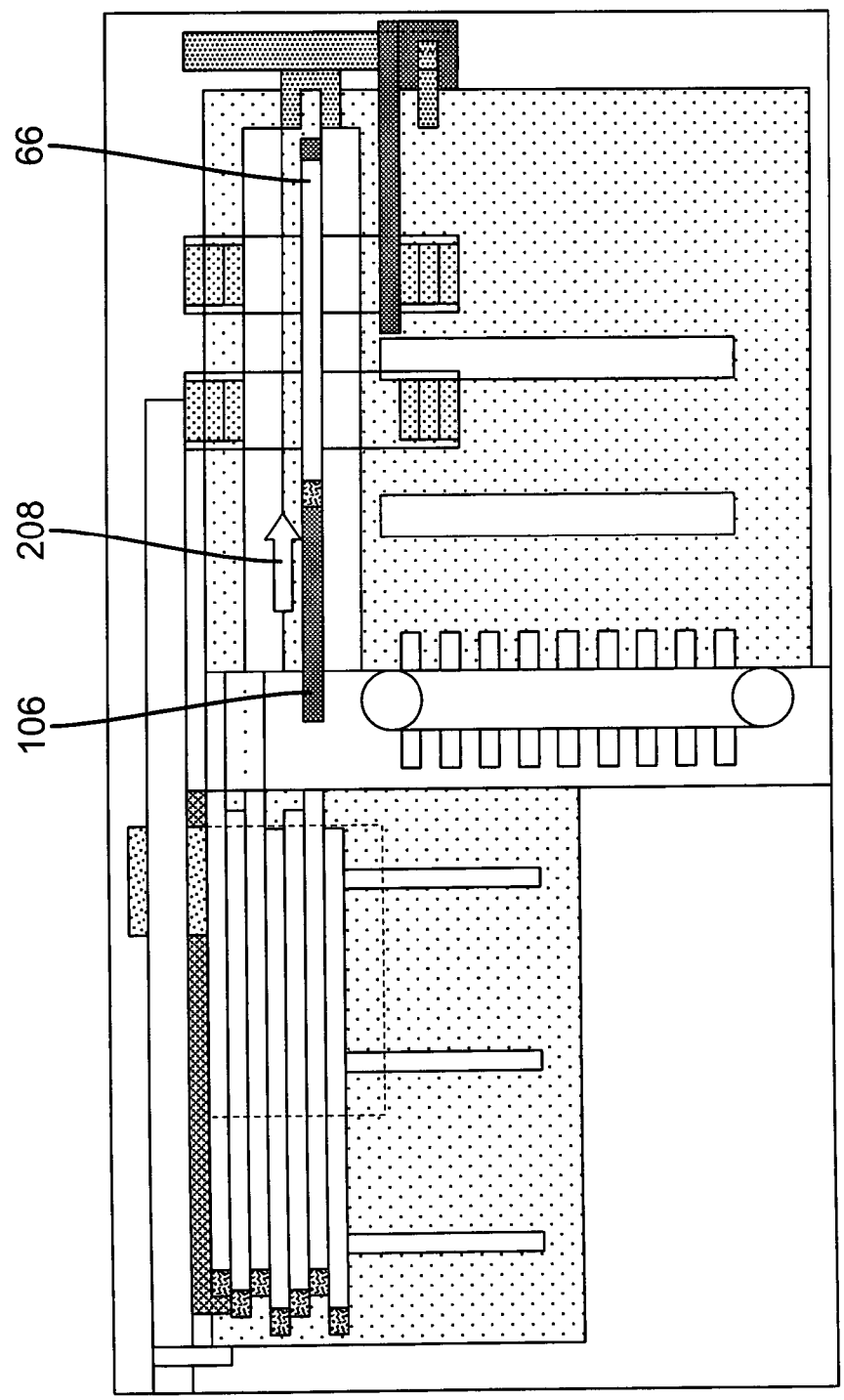
FIG. 18 is a top, plan diagrammatic view of the embodiment of FIG. 6 showing engagement of the size changer/light curtain.
Figure 19:
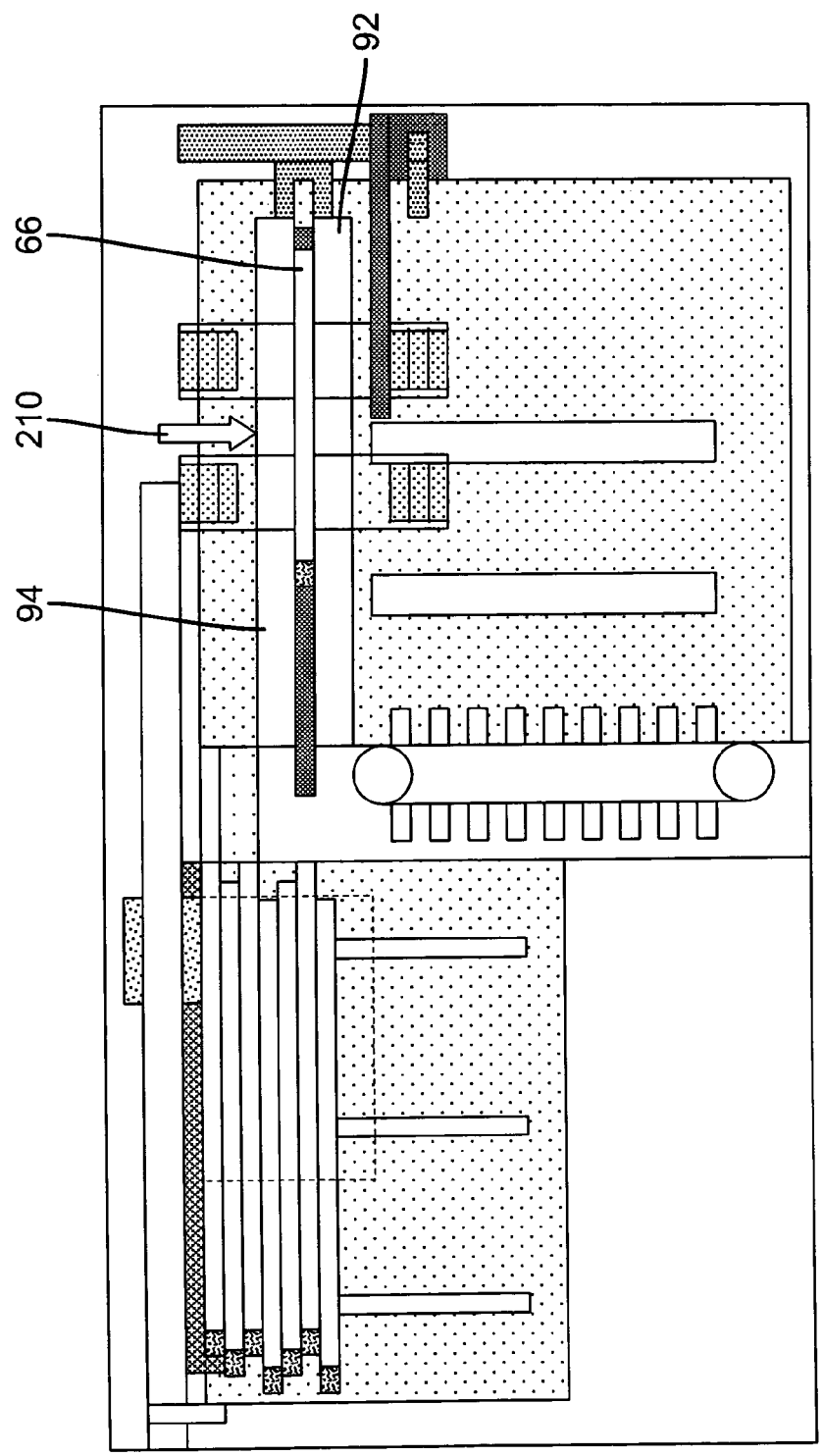
FIG. 19 is a top, plan diagrammatic view of the embodiment of FIG. 6 showing engagement of the clamps at the read location.
Figure 20:
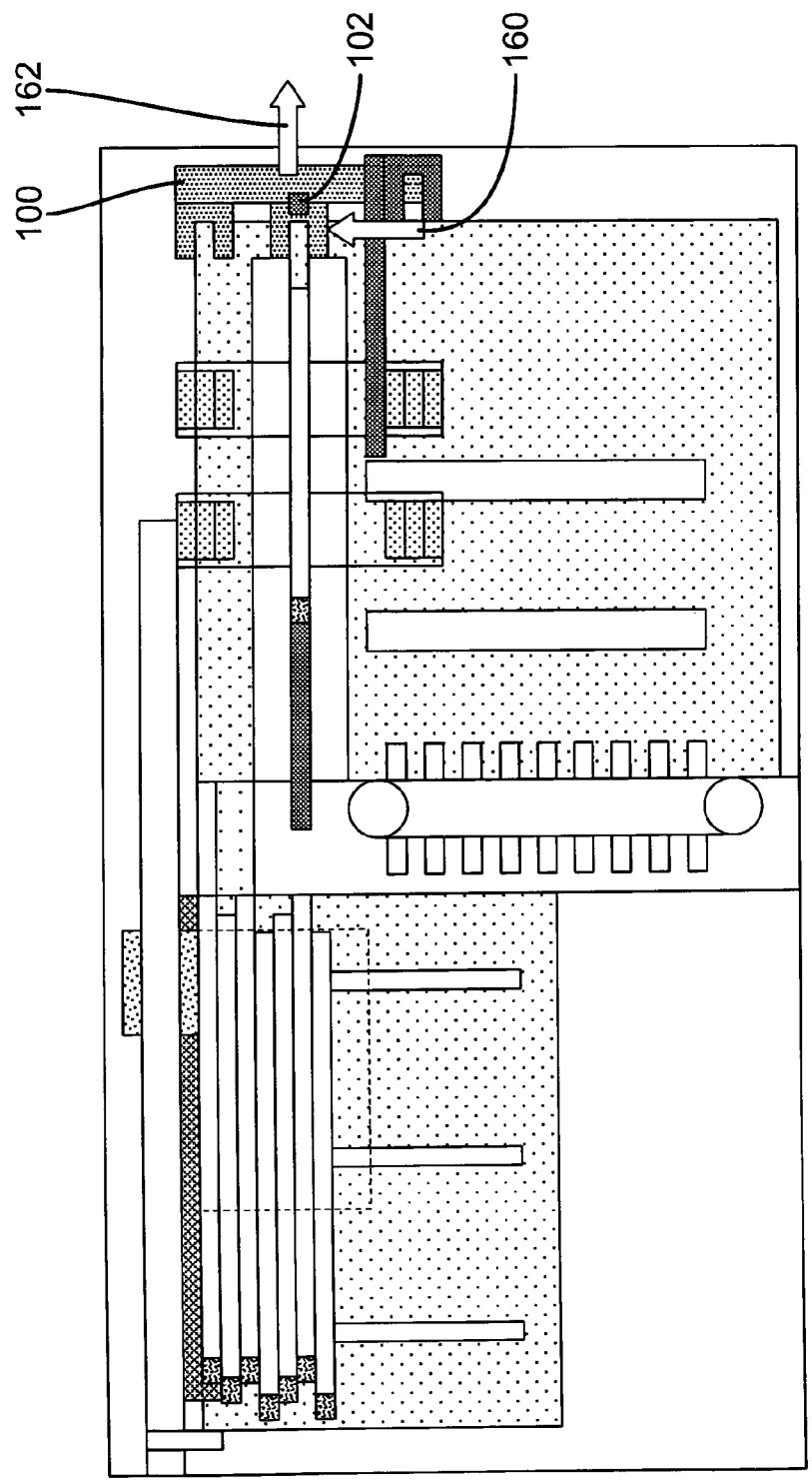
FIGS. 20-22 are top, plan diagrammatic views of the embodiment of FIG. 6 showing operations preparing for the next scan cycle.

Cassette 66 is first transported by cassette stripper 88 (arrow 201) to a barcode scan position (FIG. 12) where the barcode on cassette 66 is read by bar code scanner 90 and verified, and then to a pre-read location 200 in output bin 62 in the direction of arrow 202 (FIG. 13) into contact with side shuttle 100 and loaders 96. Cassette stripper 88 is returned to the home position (arrow 204) in input bin 60 in preparation for transport of the next cassette 66 (FIG. 14). Cassette stack pullback 84 and cassette lifter mechanism 86 are also returned to their home positions. Loaders 96 and side shuttle 100 now transport cassette 66 from the pre-read location 200 to the storage phosphor read location 64 as indicated by arrows 150 (FIGS. 15 and 16). Ejector 102 ejects cassette 66 in the direction of arrow 205 out of side shuttle 100, and side shuttle 100 and loaders 96 are returned to their home position in the direction of arrows 206 (FIG. 17). Size changer/light curtain 106 is moved in the direction of arrow 208 into place to bias the cassette 66 (FIG. 18), and movable clamp 94 is moved in the direction of arrow 210 into contact with cassette 66 to clamp it with fixed clamp 92 during the read cycle (FIG. 19). Ejector 102 and side shuttle 100 are then returned to their home positions to prepare for the next cycle as indicated by arrows 160, 162 (FIG. 20).

Figure 21:
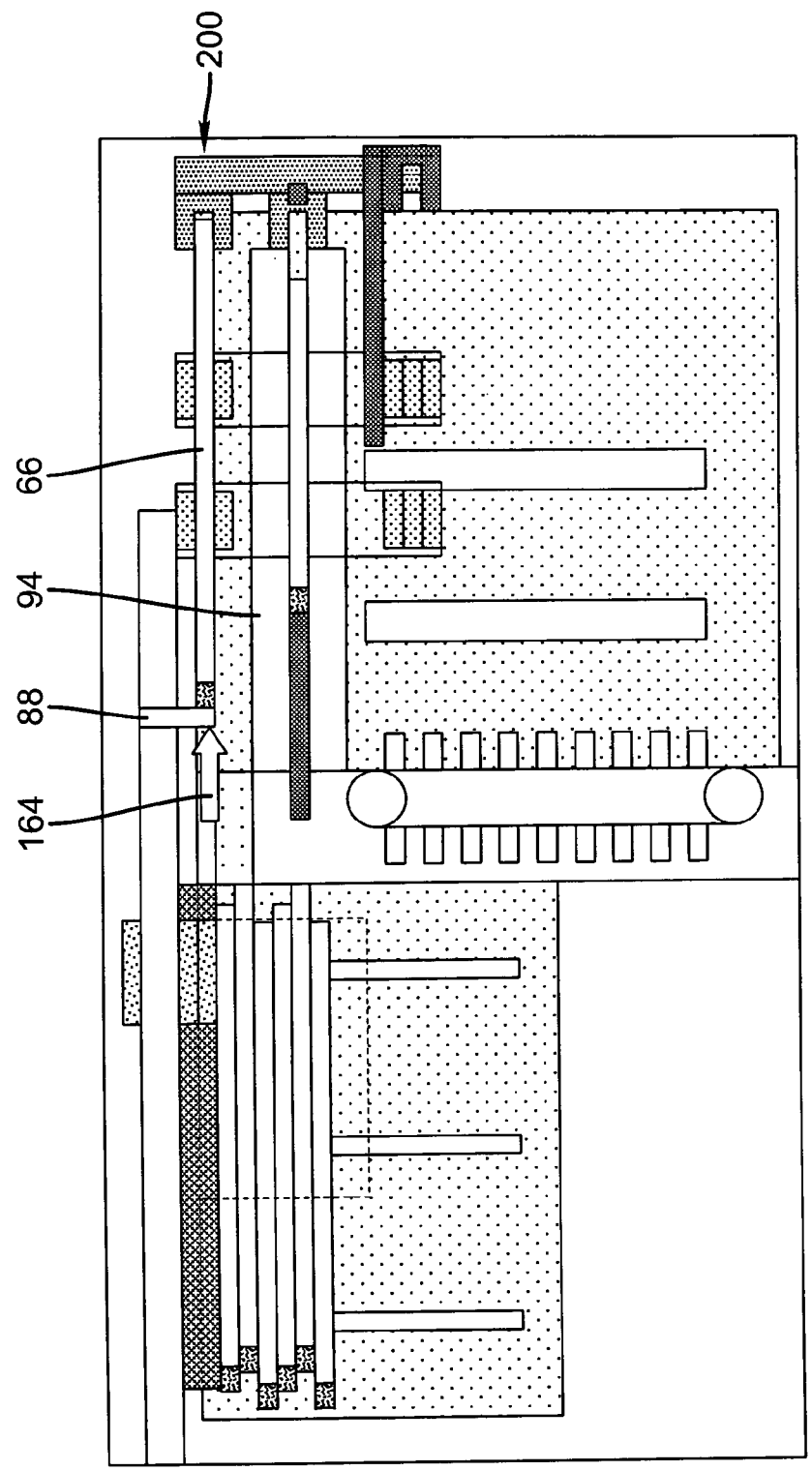
Figure 22:
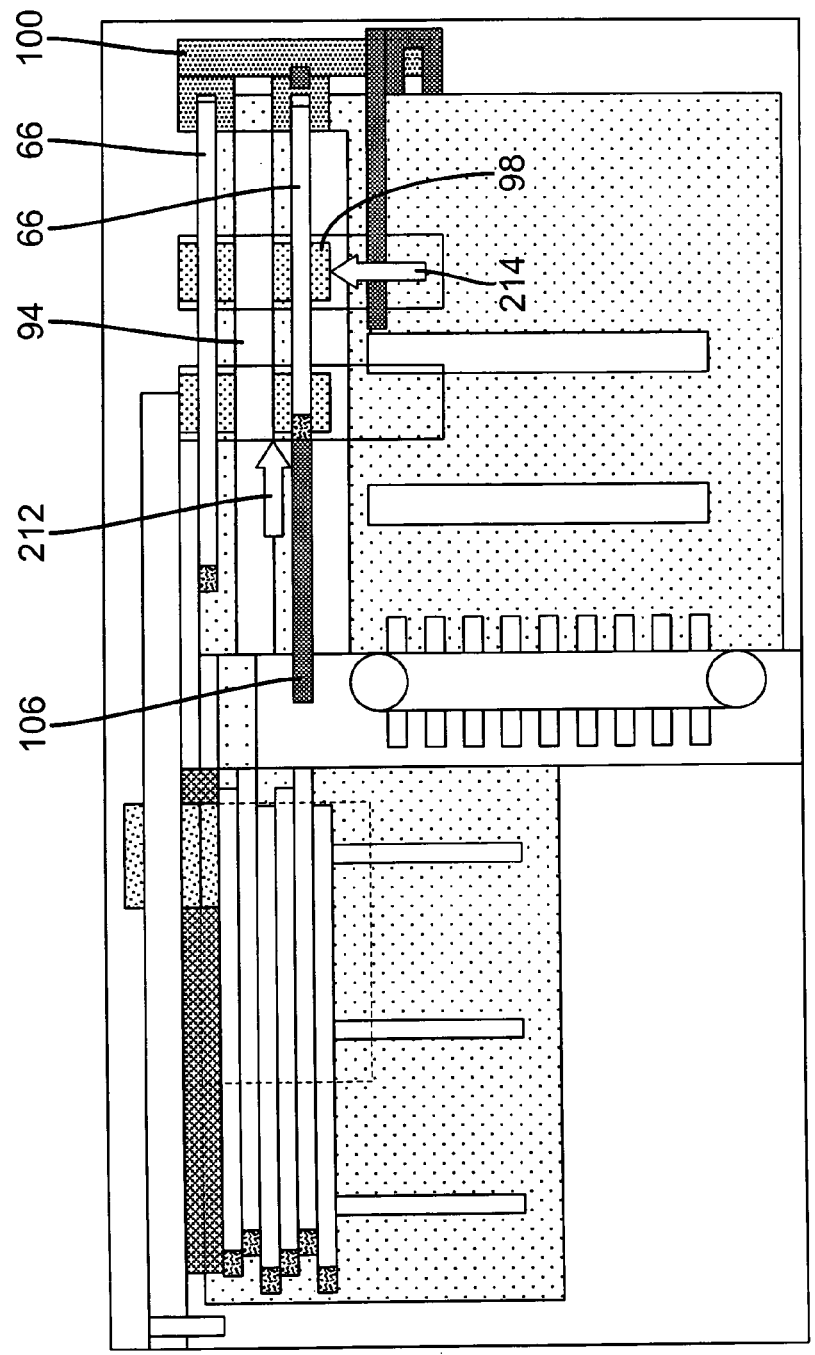
Figure 23:
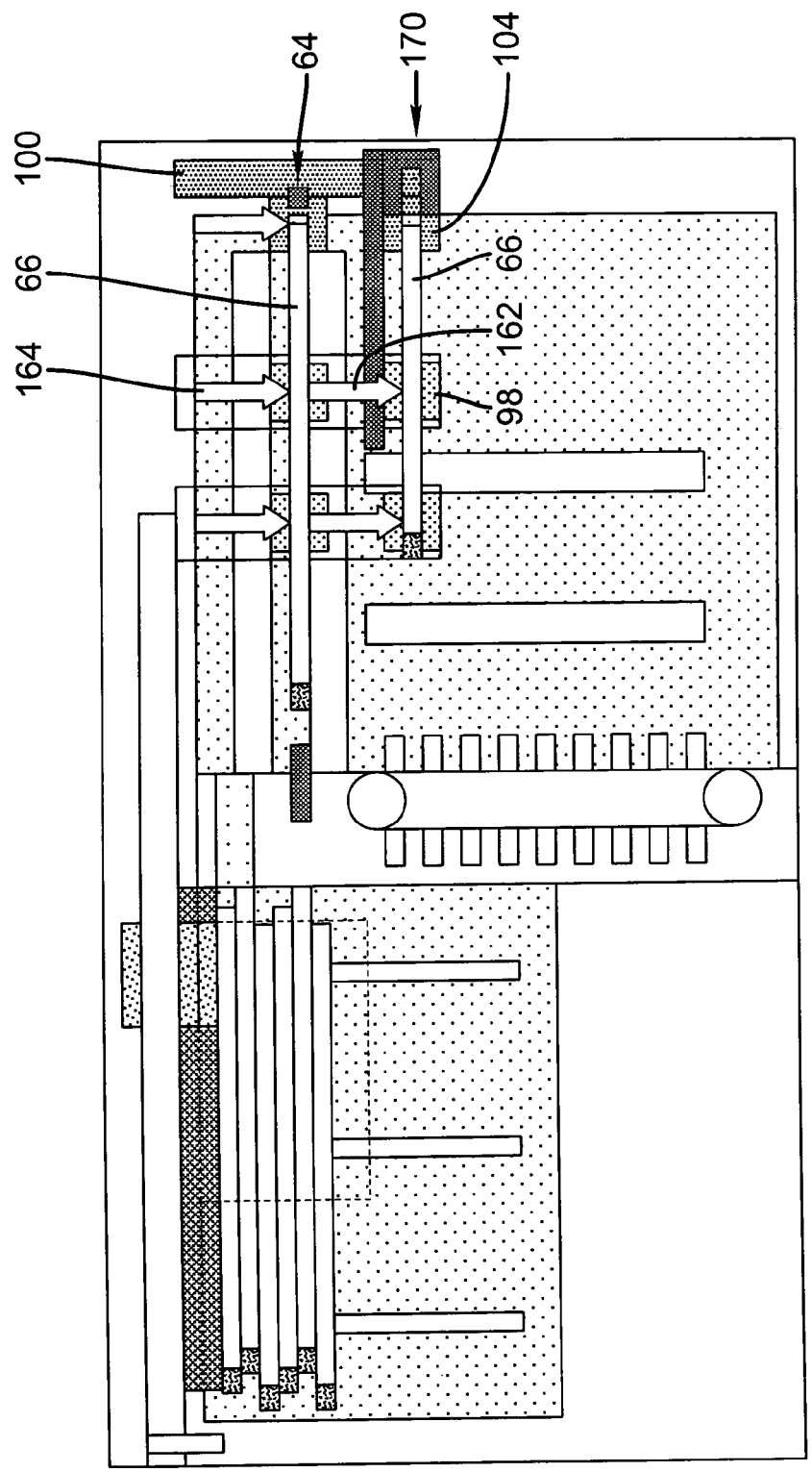
FIG. 23 is a top, plan diagrammatic view of the embodiment of FIG. 6 showing transport of the read storage phosphor cassette from the read location to a post-read location of the output bin and transport of the next unread storage phosphor cassette into the read location.
Figure 24:
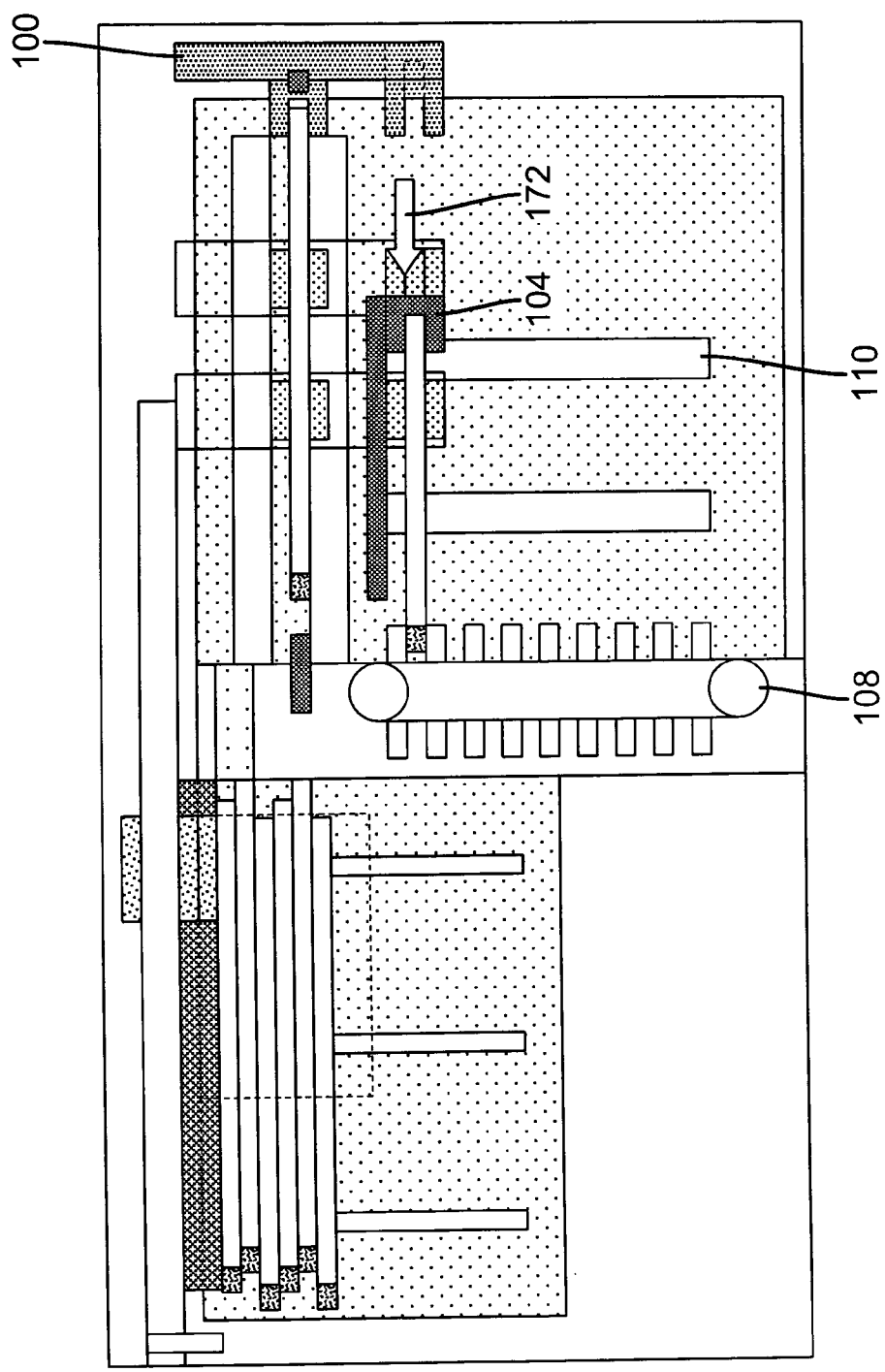
FIGS. 24 and 25 are top, plan diagrammatic views of the embodiment of FIG. 6 respectively showing transport of the read storage phosphor cassette into a collator and indexing of the collator by one position for eventual removal from the output bin.
Figure 25:
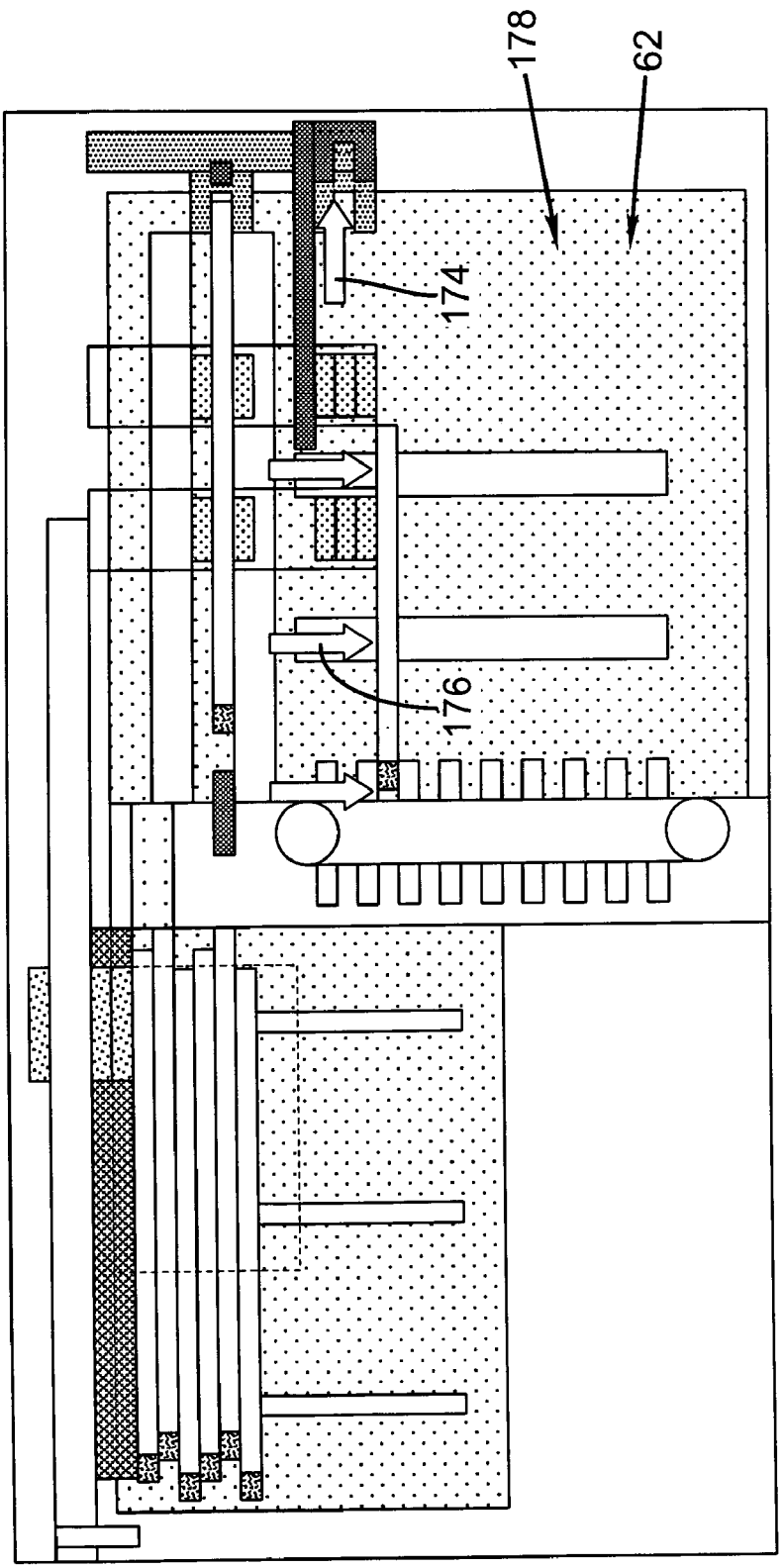

FIG. 21 shows transport of the next unread cassette 66 into the pre-read location 200 by cassette stripper 88 as indicated by arrow 164. A pre-read location is desirable in order to reduce the total cycle time of the device. This is accomplished by allowing the simultaneous reading of the SP with the next unread cassette being stripped into the pre-read location. After the read cycle is completed and the storage phosphor replaced in cassette 66, clamp 94 is moved out of contact with the read cassette 66, size changer 106 moves cassette 66 in the direction of arrow 212 into side shuttle 100, and unloaders 98 are moved in the direction of arrow 214 into contact with read cassette 66 (FIG. 22). Read cassette 66 is then moved by side shuttle 100 and unloaders 98 into a post read location 170 (arrows 162) and loaders 96 and side shuttle 100 move the next unread cassette 66 into read location 64 (FIG. 23—arrows 164.). Stripper 104 now transfers read cassette 66 from side shuttle 100 to side cog belt 108 and bottom belts 110 (FIG. 24—arrow 172). Finally, stripper 104 is returned to the home position (arrow 174) and side cog belt 108 and bottom belts 110 transport the read cassette 66 forward (arrow 176) to output region 178 of output bin 62 for subsequent removal.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10—computed radiography system
12—X-ray source
14—object of interest (body part)
16—storage phosphor (SP)
18—storage phosphor read and erase
20—digital radiographic image
50—storage phosphor reader
51—front
52—housing
53—back
54—read module
55—side
56—erase module
57—side
58—vertical autoloader
60—input bin
62—output bin
64—storage phosphor read location
66—storage phosphor cassette
68, 70—clamps
72—storage phosphor transport assembly
74—storage phosphor
76—bidirectional arrow
78—first inclined bottom wall
79—front wall
80—second reverse inclined bottom wall
82—guides
84—cassette stack pullback
85—arrow
86—cassette lifter mechanism
88—cassette stripper
90—bar code scanner
92—fixed clamp
94—movable clamp
96—loaders
98—unloaders 100—side shuttle
102—ejector
104—stripper
106—size changer/light curtain
108—side cog belt
110—bottom belts
120, 122, 124, 126, 128, 130, 132, 134, 136, 138, 140, 142—arrows
150—arrow
160, 162, 164—arrows
170—post read location
172, 174, 176,—arrows
178—output region of output bin 62
200—pre-read location
201, 202, 204, 205, 206, 208, 210, 212, 214—arrows

What is claimed is:

1. A multicassette autoloader for vertically oriented storage phosphor cassettes, the autoloader having a front, back, and opposite sides, comprising:

an input bin for receiving multiple vertically oriented storage phosphor cassettes stacked together in face-to-face contact such that said cassette faces face front and back; wherein each of said cassettes contains a storage phosphor which is removable from said cassette;

an output bin located adjacent said input bin, said output bin having a storage phosphor read location at which a storage phosphor is removed from and replaced in a storage phosphor cassette positioned at said storage phosphor read location, and having an output region for cassettes to be subsequently removed from said output bin; and an assembly for translating a storage phosphor cassette on substantially horizontal plane in a U-shaped path from said input bin, to said storage phosphor read location in said output bin and then to said output region of said output bin for subsequent removal from said output bin, wherein the cassette translates along the U-shaped path from said input bin to said output bin in an ambient light environment.

2. The autoloader of claim 1 wherein said input bin has an inclined bottom wall to assist in gravity feeding a received stack of cassettes.

3. The autoloader of claim 1 wherein said assembly includes a stripper for transporting a cassette from said input bin to said output bin.

4. The autoloader of claim 3 wherein said assembly includes in said input bin a cassette stack pullback mechanism and a cassette lifter mechanism operating in cooperation with said stripper to facilitate transport of a cassette from said input bin by said stripper.

5. The autoloader of claim 1 including a bar code scanner and wherein as a cassette is transported from said input bin to said output bin it passes said bar code scanner which scans a barcode on said cassette.

6. The autoloader of claim 3 wherein said output bin includes a pre-read location in advance of said read location and wherein said cassette is transported by said stripper to said pre-read location in said output bin.

7. The autoloader of claim 6 wherein said assembly includes a side and bottom shuttle in said output bin for transporting said cassette from said pre-read location to said read location and then to a post-read location.

8. The autoloader of claim 1 wherein said output bin includes a clamp to hold a cassette at said read location.

9. The autoloader of claim 1 wherein said assembly includes in said output bin a cog shuttle for transporting read cassettes to said output region of said output bin for removal.

10. The autoloader of claim 1 including a storage phosphor reader, wherein said autoloader is mounted on the top of said reader.

11. The autoloader of claim 10 wherein said autoloader is integral with said storage phosphor reader.

12. The autoloader of claim 10 wherein said storage phosphor reader includes a read module, an erase module, and a vertical assembly positioned at said read location for removing a storage phosphor from a cassette positioned at said read location, for transporting said removed storage phosphor past said read and erase modules, and for replacing said storage phosphor in said cassette.

* * * * *